(12) United States Patent (10) Patent No.: US 8,116,623 B2
Chung et al. (45) Date of Patent: Feb. 14, 2012

(54) MULTI-RING NETWORK OPERATING METHOD AND SYSTEM

(75) Inventors: Hwan-Seok Chung, Daejeon (KR); Sun-Hyok Chang, Daejeon (KR); Sang-Soo Lee, Daejeon (KR); Kwang-Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 924 days.

(21) Appl. No.: 12/127,493

(22) Filed: May 27, 2008

(65) Prior Publication Data

US 2008/0317466 A1 Dec. 25, 2008

(30) Foreign Application Priority Data

Jun. 25, 2007 (KR) .................. 10-2007-0062498

(51) Int. Cl.
*H04B 10/00* (2006.01)
(52) U.S. Cl. ................. 398/3; 398/12; 398/19
(58) Field of Classification Search .......... 359/110–128; 370/16, 16.1, 60
See application file for complete search history.

(56) References Cited

U.S. PATENT DOCUMENTS

| 6,226,111 | B1 * | 5/2001 | Chang et al. ............... 398/9 |
| 6,616,349 | B1 * | 9/2003 | Li et al. ................... 398/4 |
| 6,625,653 | B1 | 9/2003 | Zimerman et al. |
| 7,035,203 | B2 | 4/2006 | Licata et al. |
| 2008/0232802 | A1 * | 9/2008 | Wang ...................... 398/59 |

FOREIGN PATENT DOCUMENTS

| KR | 1020010011135 | 2/2001 |
| KR | 1020040033202 | 4/2004 |
| KR | 1020040033859 | 4/2004 |
| KR | 1020040045965 | 6/2004 |

OTHER PUBLICATIONS

Korean Office Action for Application No. 10-2007-0062498, dated Nov. 25, 2008.
Korean Office Action for Application No. 9-5-2008-059368094, dated Nov. 25, 2008.
Al Sayeed, Choudhury A. et al., "Transparent Ring-to-Ring Interconnection for Metro Core Optical Network," *Proceedings of the 4th Annual Communication Networks and Services Research Conference (CNSR '06)*, (2006).
Singhal, Narendra K. et al., "Architectures and Algorithm for Multicasting in WDM Optical Mesh Networks using Opaque and Transparent Optical Cross-Connects," *Optical Fiber Communication Conference and Exhibit*, vol. 2:Tug8-1-TuG8-3 (2001).

* cited by examiner

*Primary Examiner* — Dzung Tran
(74) *Attorney, Agent, or Firm* — Nelson Mullins Riley & Scarborough LLP; EuiHoon Lee, Esq.

(57) ABSTRACT

Provided is a multi-ring network operating method of cross-connecting at least two ring networks, the method including connecting an input working ring and an input protection ring of a ring network to an output working ring and an output protection ring of another ring network and then performing cross-connection between the same or different ring networks by using a multi-dimensional cross-connect apparatus. In the multi-ring operating method, a plurality of ring networks can be connected regardless of the protection method used by the ring networks, and the original protection method of each ring network can remain after they are connected.

27 Claims, 25 Drawing Sheets

FIG. 15A (1)
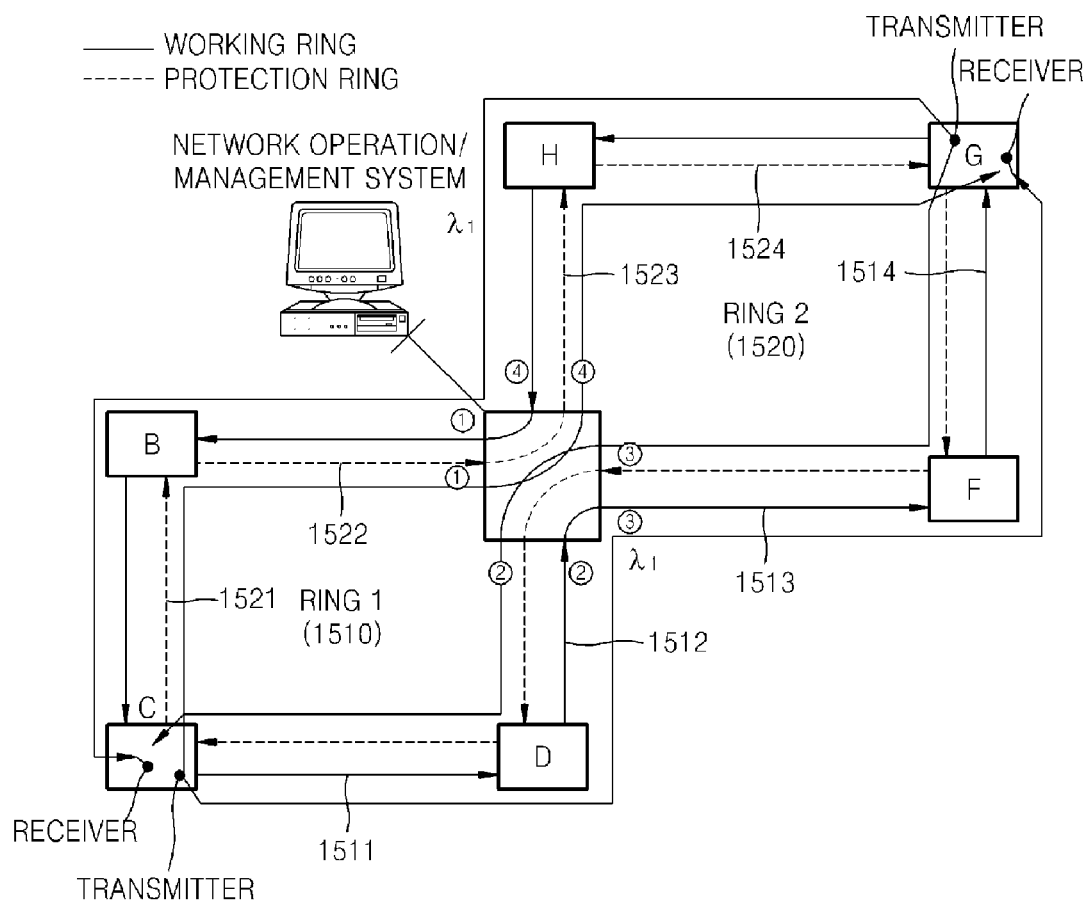

FIG. 15A (2)
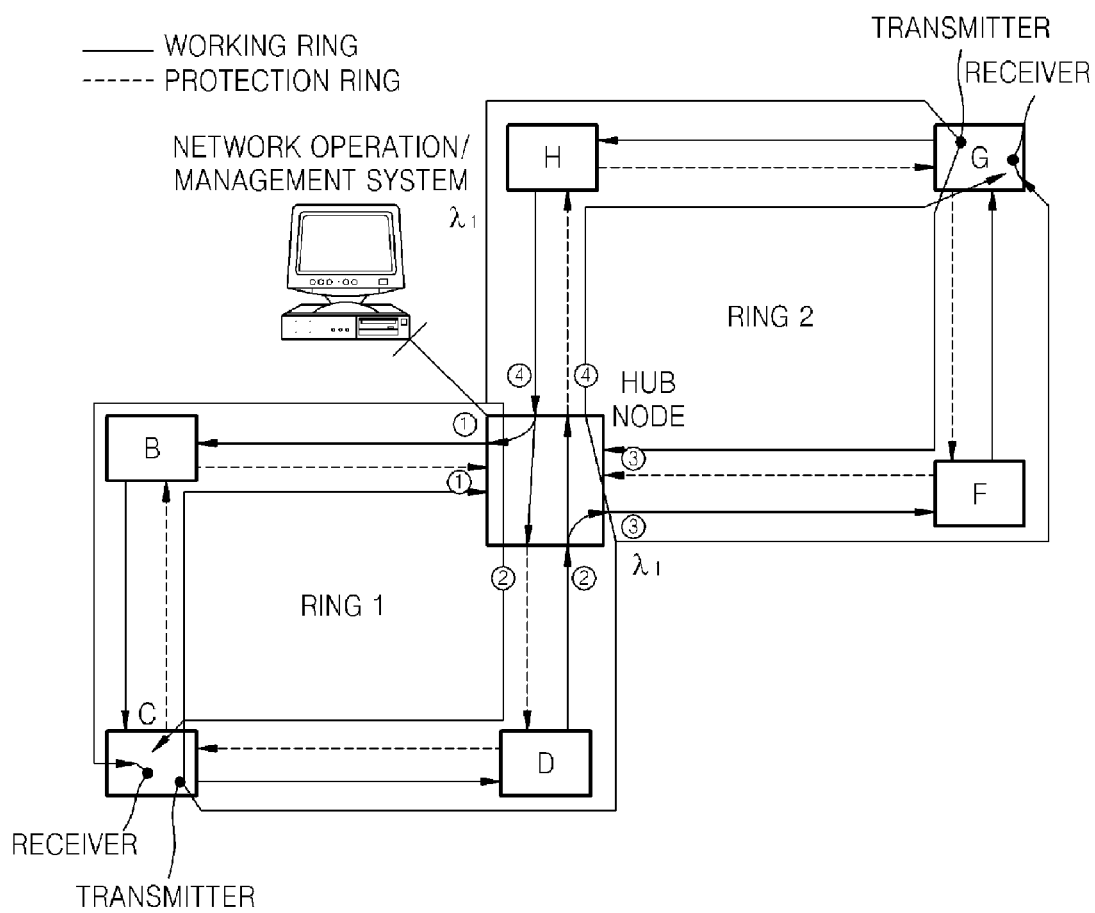

MULTI-RING NETWORK OPERATING METHOD AND SYSTEM

CROSS-REFERENCE TO RELATED PATENT APPLICATIONS

This application claims the benefit of Korean Patent Application No. 10-2007-0062498, filed on Jun. 25, 2007, in the Korean Intellectual Property Office, the disclosure of which is incorporated herein in its entirety by reference.

BACKGROUND OF THE INVENTION

1. Field of the Invention

The present invention relates to a multi-dimensional optical cross-connect (OXC) apparatus having a multi-casting function both in an optical domain and in an electrical domain, and more particularly, a multi-dimensional optical cross-connect apparatus in which data which does not require signal reproduction or wavelength conversion is cross-connected in the optical domain, and signals which require signal reproduction or wavelength conversion are cross-connected in the electrical domain This work was supported by the IT R&D program of MIC/ITA. [2006-S-059-02, ASON based Metro Photonic Cross-Connect Technology]

2. Description of the Related Art

In a conventional optical-electrical-optical (O/E/O) information process, i.e., electrically processing all information after optical to electrical conversion in each network node, problems arise, in that an electrical information process itself causes a bottleneck as data throughput between nodes increases, and a higher cost is incurred for the electrical information process that increases in proportion to the data throughput.

When transmitting data from a 1:1 protection ring to a 1+1 protection ring using a conventional ring network cross-connection method, a single signal input from a hub node has to be copied into two signals and transmitted due to the nature of the ring network operation method. However, this ring network operation cannot be implemented with the conventional ring network structure.

In addition, when data is transmitted from a 1+1 protection ring to a 1:1 protection ring, only one of the two input data input from 1+1 protection ring has to be transmitted to 1:1 protection ring. However, this function also cannot be implemented with the conventional ring network structure. In addition, another drawback of the conventional structure is that, even when two 1+1 ring networks are cross-connected, network failures simultaneously occurring in the two ring networks cannot be overcome.

In addition, a conventional method of implementing a multi-casting function with a signal copy function by using an electrical switch, instead of an optical switch, has problems, in that an electrical information process causes a bottleneck as data throughput increases, and a higher cost is incurred for the electrical information process that increases in proportion to the data throughput.

Furthermore, in the case of using only an optical multi-casting process, problems arise, such as a collision of wavelengths, which occurs due to the use of the same wavelength for data transmission between different ring networks, or signal deterioration due to long-distance signal transmission.

SUMMARY OF THE INVENTION

To solve the problems with the conventional method, the present invention provides a multi-dimensional optical cross-connect (OXC) apparatus having a multi-casting function both in an optical domain and an electrical domain.

In particular, the present invention provides an optical cross-connect apparatus having a multi-casting function both in the optical domain and the electrical domain, in which data that does not require regeneration or wavelength conversion is cross-connected in the optical domain, and signals that do require regeneration or wavelength conversion are cross-connected in the electrical domain, and provides an efficient multi-ring network cross-connection method using the optical cross-connect apparatus.

According to an aspect of the present invention, there is provided a multi-ring network operating method of cross-connecting at least two ring networks, the method comprising: cross-connecting an input working ring and an input protection ring of a first ring network to an output working ring and an output protection ring of a second ring network; splitting an input multi-wavelength optical signal of the first ring network into at least one direction each having a specific wavelength, by using an optical coupler; and transmitting the input multi-wavelength optical signal to at least one wavelength selective switch, wherein the wavelength selective switch selectively passes at least one input multi-wavelength optical signal within the input ports through at least one output of the second ring network.

According to another aspect of the present invention, there is provided a multi-ring network operating system for cross-connecting at least two ring networks, the system comprising: a ring network connection unit connecting an input working ring and an input protection ring of a first ring network to an output working ring and an output protection ring of a second ring network; an optical coupler splitting an input multi-wavelength optical signal of the first ring network into at least one direction each having a specific wavelength; a connection control unit transmitting the input multi-wavelength optical signal to at least one wavelength selective switch; and the at least one wavelength selective switch selectively passes at least one input multi-wavelength optical signal within the input ports through at least one output of the second ring network.

According to another aspect of the present invention, there is provided a multi-dimensional cross-connect apparatus used in a multi-ring network operating system, the apparatus comprising: an optical coupler splitting an input multi-wavelength optical signal into at least one direction each having a specific wavelength; a connection control unit transmitting the input multi-wavelength optical signal to at least one wavelength selective switch; and the at least one wavelength selective switch selectively pass at least one input multi-wavelength optical signal within the input ports through at least one output.

BRIEF DESCRIPTION OF THE DRAWINGS

The above and other features and advantages of the present invention will become more apparent by describing in detail exemplary embodiments thereof with reference to the attached drawings in which:

FIGS. 15A through 15C illustrate a multi-ring network operating method using a multi-dimensional cross-connect apparatus according to an embodiment of the present invention when a first ring network uses 1+1 protection and a second ring network uses 1+1 protection;

DETAILED DESCRIPTION OF THE INVENTION

Figure 1A:
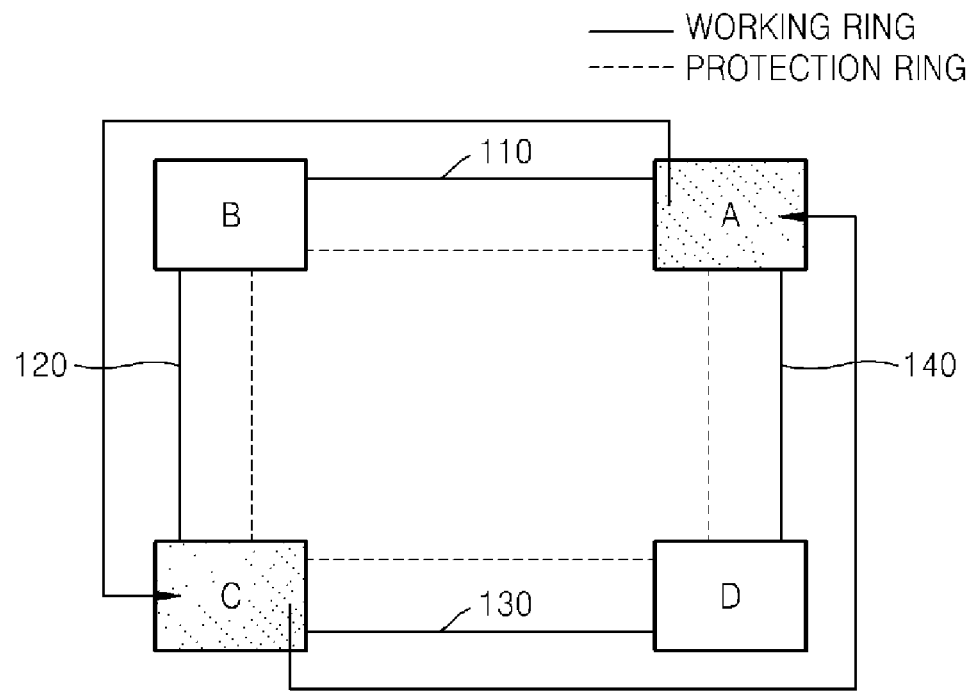
FIGS. 1A and 1B are views for illustrating operations in a normal state and in a protection state, respectively, in ring networks using 1:1 protection.

Hereinafter, exemplary embodiments of the present invention will be described with reference to the attached drawings. It should be noted that like reference numerals in the drawings denote like elements, even though they are in different drawings.

In the detailed description of the invention below, detailed descriptions of relevant disclosed functions or structures will be omitted if they are considered to make the subject matter of the invention ambiguous.

In general, network topologies implemented using an optical transmission apparatus are classified into a point-to-point type, a linear type, a ring type, and a mesh type. Ring networks are in widespread use due to their simple topology and their ability of fast restoration/protection within 50 ms. Methods of recovering failures in ring networks are largely classified into 1:1 protection and 1+1 protection.

Figure 1B:
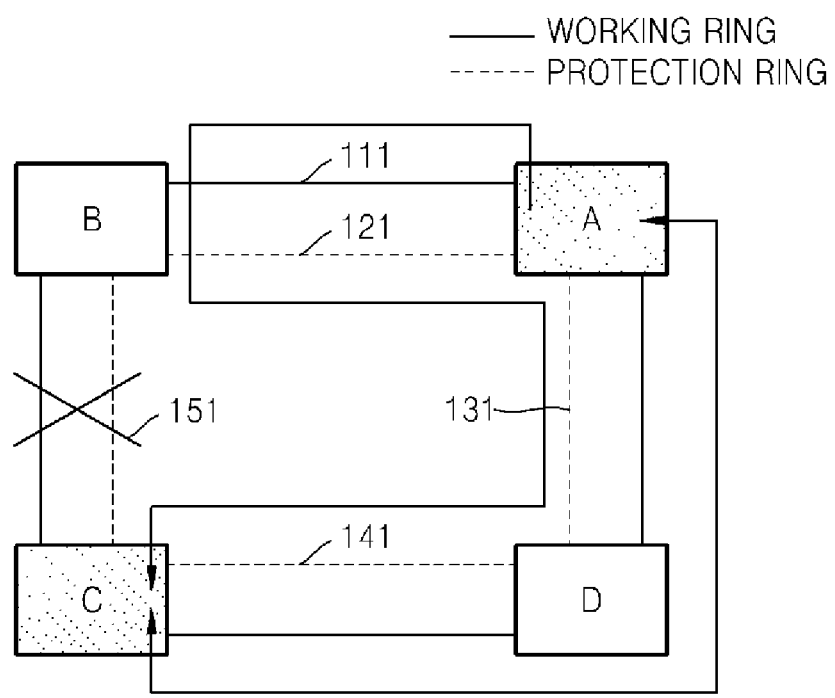

FIGS. 1A and 1B are views for illustrating exemplary operations in a normal state and in a protection state, respectively, in ring networks using 1:1 protection.

A 1:1 protection network includes working rings for transmitting data in a normal operation state and protection rings for transmitting data in a protection state.

In an example of transmitting data in a ring network using 1:1 protection in a normal operation state, as shown in FIG. 1A, data is transmitted from node A to node C via node B through a working ring (110→120), and data is also transmitted from node C to node A via node D through a working ring (130→140).

In an example of transmitting data in a ring network using 1:1 protection when an failure occurs, as shown in FIG. 1B, when an failure occurs due to a line cutoff between node B and C, as indicated by reference numeral 151, data, which is originally transmitted from node A to node C via node B, is transmitted from node B to node A through a protection ring. In other words, data which has started from node A is originally transmitted to node B through a working ring 111 and is transmitted back from node B to node A through a protection ring 121 and then to node D through a protection ring 131 and to node C through a protection ring 141.

Figure 2A:
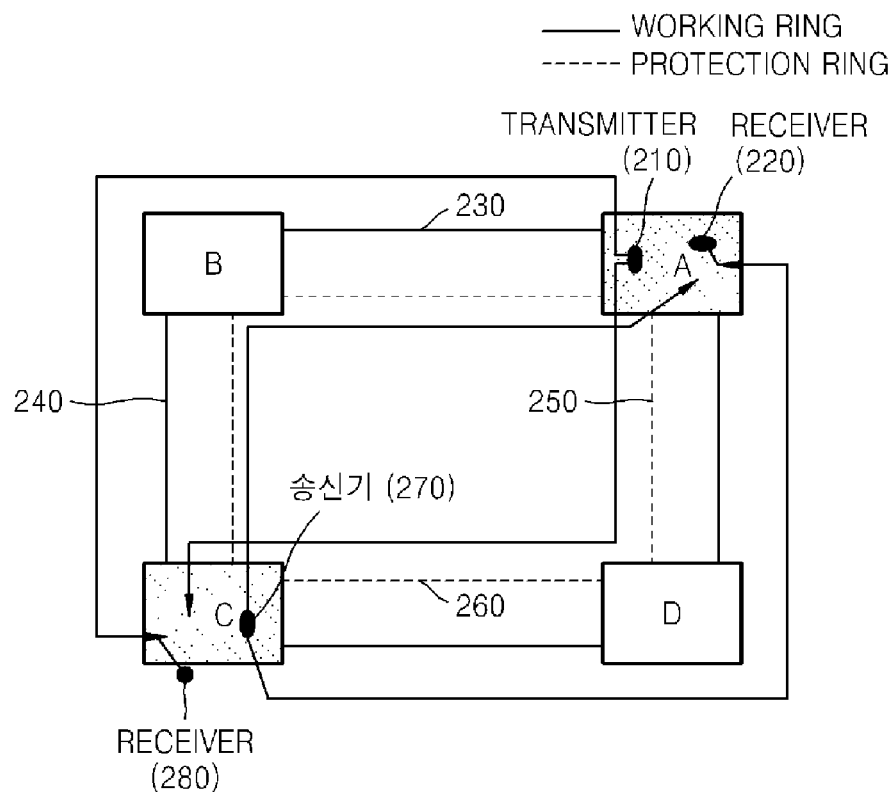
FIGS. 2A and 2B are views for illustrating operations in a normal state and in a protection state, respectively, in ring networks using 1+1 protection.
Figure 2B:
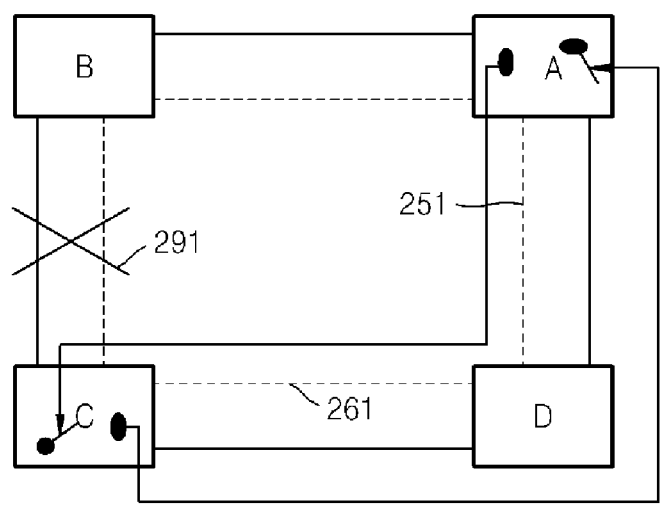

FIGS. 2A and 2B are views for illustrating exemplary operations in a ring network using 1+1 protection in a normal state and when failure occurs, respectively.

In a 1+1 protection network, data is copied into two signals in a normal operation. One of the signals is transmitted through a working ring, and the other is transmitted through a protection ring. A receiving end selectively receives one of the two signals of higher quality.

In an example of transmitting data in a ring network using 1+1 protection in a normal operation state, as shown in FIG. 2A, a transmitter 210 of node A transmits same data in two ways. One way is through a working ring, where data is transmitted from node A to node C via node B (230->240) and the other way is through a protection ring, where data is transmitted from node A to node C via node D (250->260). A receiving end 280 of node C selects data transmitted through the working ring because it is of higher quality.

In an example of transmitting data in a ring network using 1+1 protection when failure occurs, as shown in FIG. 2B, when failure occurs between nodes B and C, as indicated by reference numeral 291, data could not be transmitted from node A to node C via node B (230→240) any longer. In this case (FIG. 2B), a receiving end 280 of node C selects the data signal transmitted from node A to node C via node D (251→261) through a protection ring, thereby enabling robust communication to network failure.

For long-distance data transmission, data transmission between different ring networks is required. A conventional method for achieving such long-distance data transmission is illustrated in FIG. 3.

Figure 3:
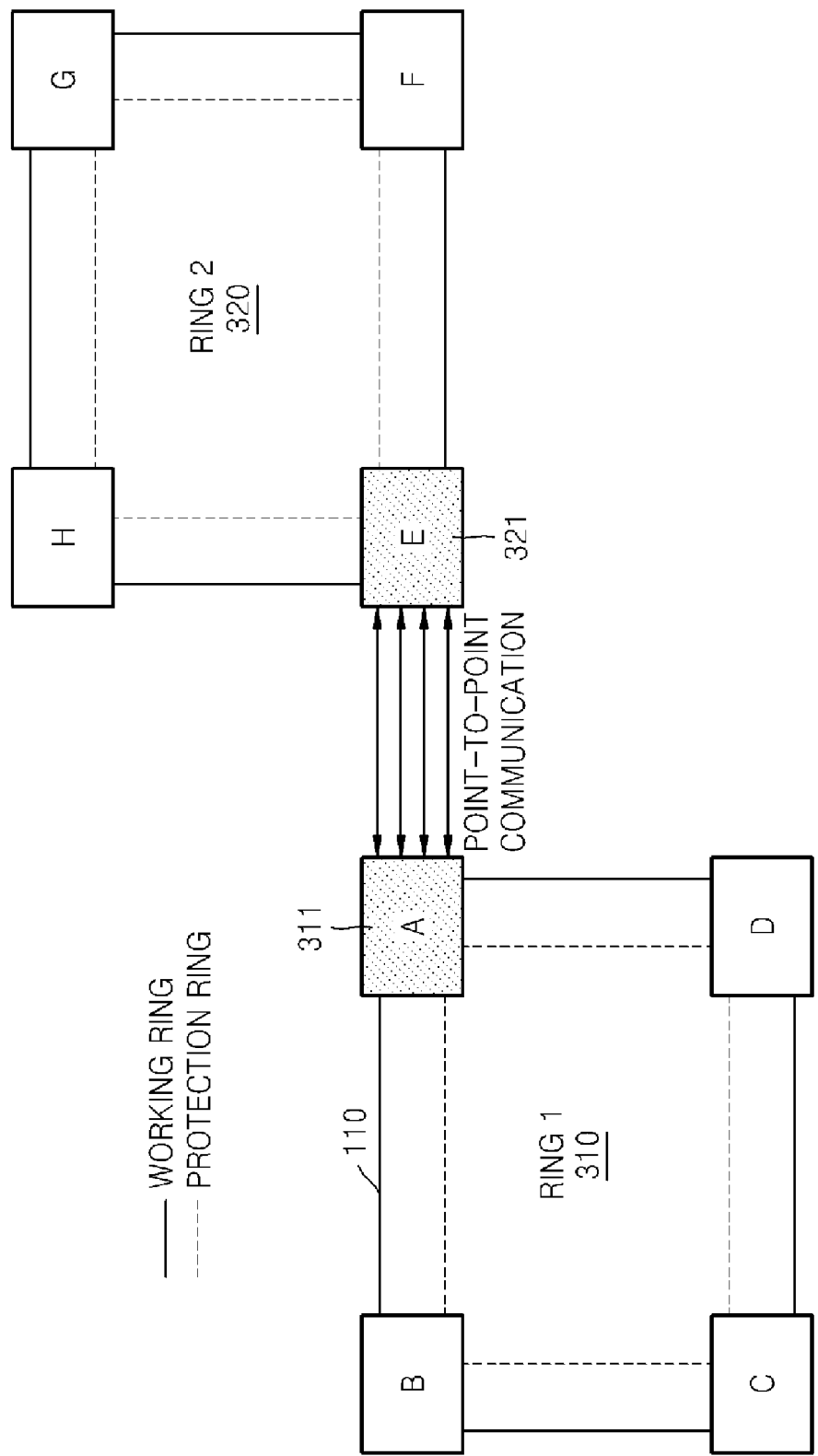
FIG. 3 illustrates a point-to-point communication method for data transmission between different ring networks.

FIG. 3 illustrates a point-to-point communication method for data transmission between different ring networks.

As shown in FIG. 3, data is transmitted via a hub node A (311) and a node E (321) to a ring network 320 (Ring 2). In this case, a cross-connection is required in order to efficiently link data transmitted between the node A (311) and the node E (321).

To this end, in the disclosed conventional method, data is transmitted between two hub nodes by performing optical-electrical-optical conversion at each hub node.

However, in this case, as described above, in the conventional optical-electrical-optical (O/E/O) information process, i.e., in electrically processing all information after optical to electrical conversion, the electrical information process itself causes a bottleneck as data throughput increases between the nodes, and the cost for the electrical information process increases in proportion to the data throughput.

To solve these problems, in the present invention, for a signal which is neither dropped nor added in a node, the signal is transmitted as an optical signal without conversion to an electrical signal. In addition, only a signal which is to be dropped or added undergoes optical to electrical and electrical to optical conversion, thereby lowering the cost of the system and simplifying the structure of the system.

Figure 4:
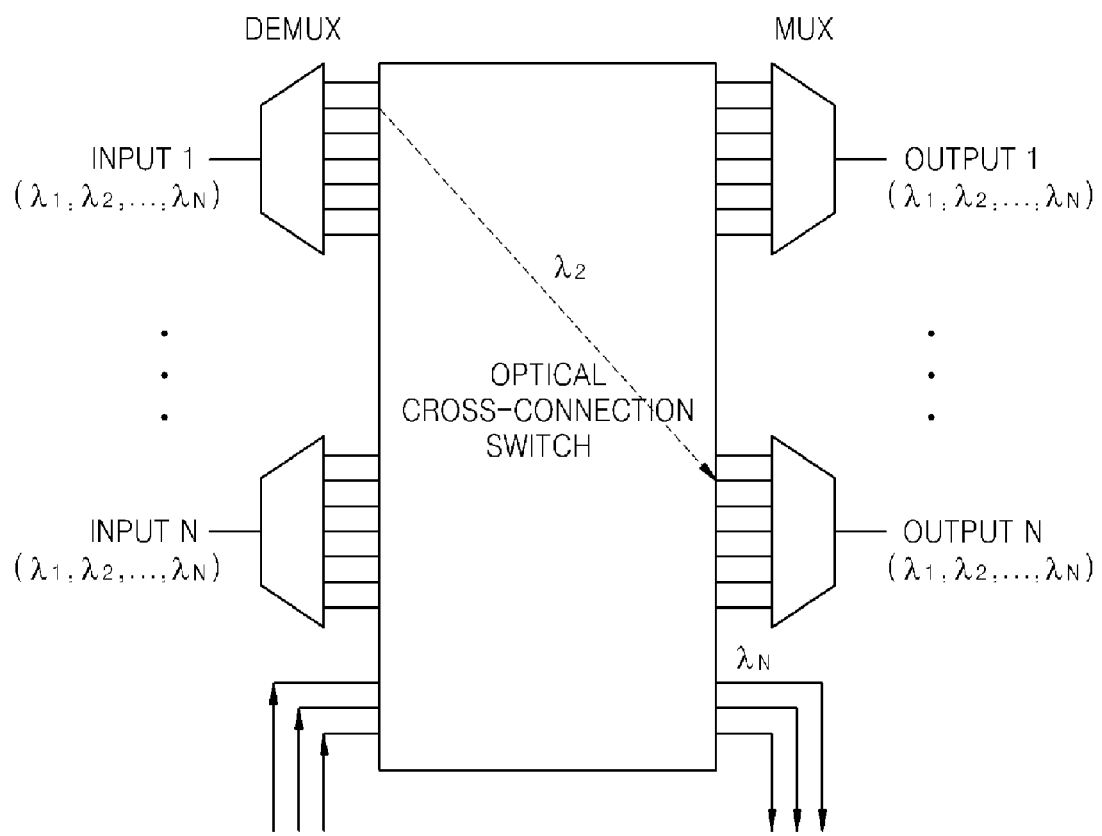
FIG. 4 is a view of an exemplary optical cross-connect apparatus for describing a method of cross-connecting different ring networks.

FIG. 4 is a view of an optical cross-connect apparatus for explaining an exemplary method of cross-connecting different ring networks.

For the optical cross-connect apparatus of FIG. 4, in which different ring networks are cross-connected according to a conventional method, assuming input 1 is an input port of the ring network (Ring 1) and output N is an output port of the ring network (Ring 2), data can be transmitted from the ring network (Ring 1) to the ring network (Ring 2) by using a wavelength $\lambda_2$.

However, when data is transmitted from a 1:1 protection ring to a 1+1 protection ring, a single input signal has to be copied into two signals in a hub node and then transmitted due to the nature of the ring network operation method. However, this operation is actually impossible. In addition, when data is transmitted from a 1+1 protection ring to a 1:1 protection ring, only one of the two input data input from 1+1 protection ring has to be transmitted to 1:1 protection ring. However, this function cannot be implemented with the conventional structure. In addition, another drawback of the conventional structure is that, even when 1+1 ring networks are cross-connected, network failures simultaneously occurring in the two ring networks cannot be overcome.

Figure 5:
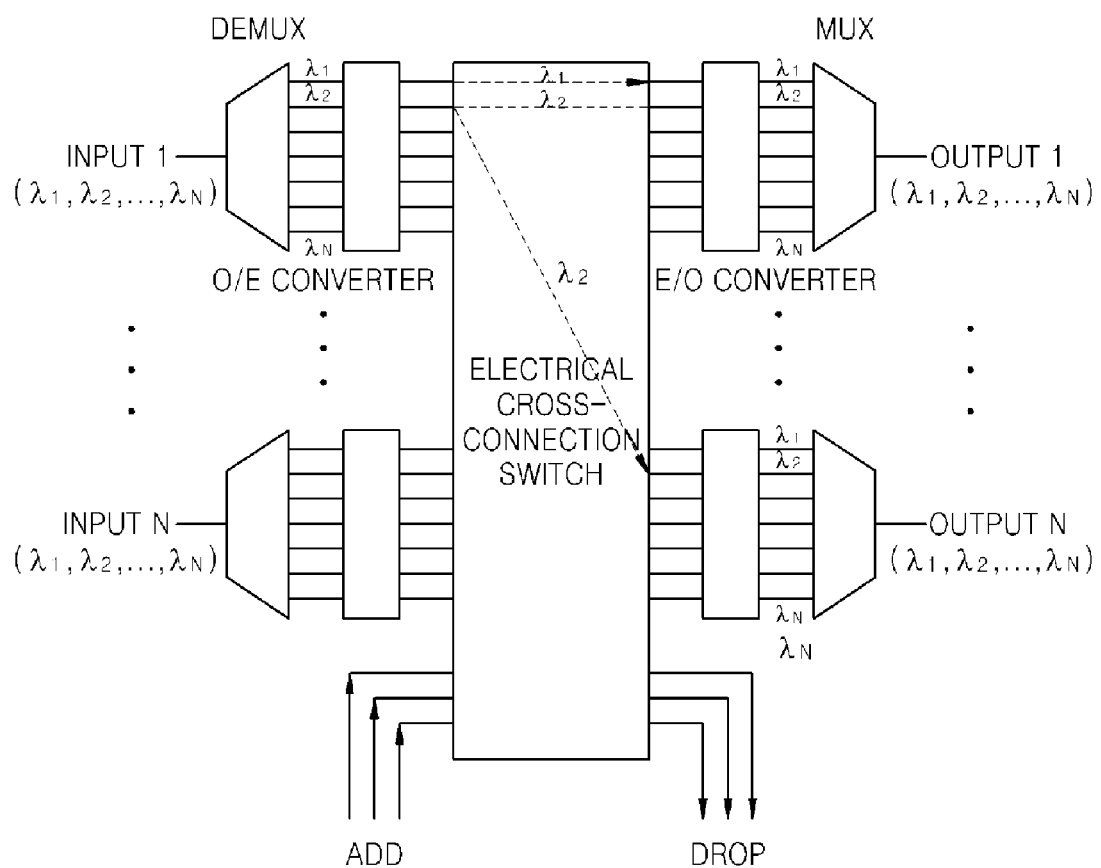
FIG. 5 is a view of another exemplary cross-connect apparatus having a multi-casting function.

FIG. 5 illustrates a structure of an optical cross-connect apparatus having a multi-casting function.

FIG. 5 relates to a conventional technology of implementing a multi-casting function in which a single signal is copied into multiple signals and transmitted along different paths. In such an optical cross-connect apparatus as illustrated in FIG. 5, the signal copy function is implemented using an electrical switch instead of an optical switch.

However, in this case, in order to use the electrical switch, all data has to undergo optical to electrical and electrical to optical conversion, and thus the electrical information process itself causes a bottleneck as data throughput increases, and the costs incurred for the electrical information process increases in proportion to the data throughput.

In order to solve the problems arising with the conventional art described with reference to FIGS. 3 through 5, in the present invention, it is intended to enable multi-casting both in an optical domain and an electrical domain and wavelength conversion and signal reproduction in the electrical domain, so that efficient cross-connection between multiple ring networks is achieved based on these features. In addition, the present invention provides a method of rapidly fixing a network failure, such as an optical fiber cutoff, in cross-connected ring networks.

Figure 6:
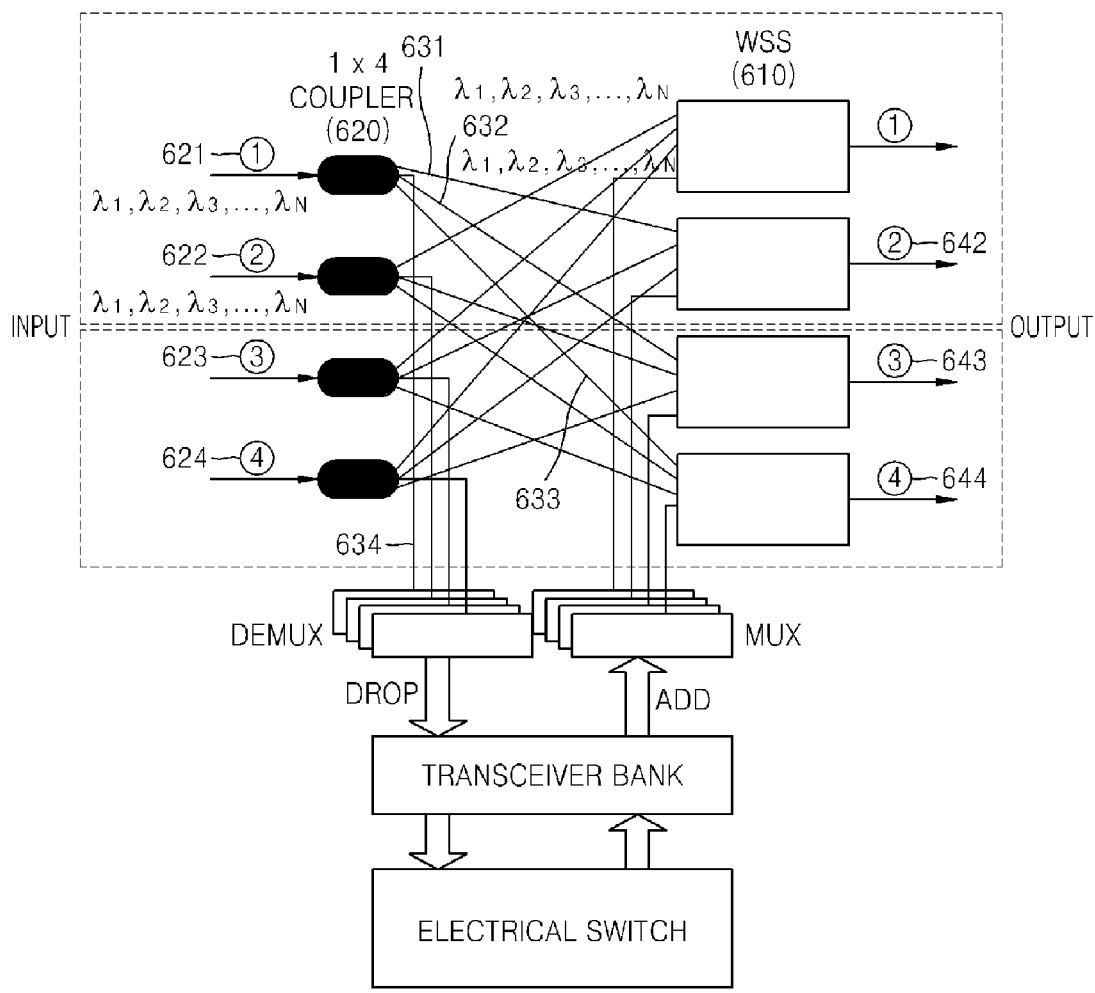
FIG. 6 is a view of a multi-dimensional cross-connect apparatus according to an embodiment of the present invention.

FIG. 6 illustrates a multi-dimensional cross-connect apparatus according to an embodiment of the present invention.

A wavelength selective switch (WSS) 610 is a device which allows a portion having an arbitrary wavelength from among a plurality of wavelengths of signals input through a number of input ports to selectively pass one output port. In addition, the magnitude of an input signal can be adjusted according to wavelengths, and it is possible to determine whether to block or transmit the signal. This will be described in more detail below with reference to FIGS. 7A and 7B.

A one-to-one connection function in a multi-dimensional cross-connect apparatus according to the present invention will now be described.

An input signal, or a portion of an input signal, having a wavelength $\lambda_1$, from a first input port 621 is split into four paths 631, 632, 633, and 634 by an optical coupler 620 and respectively linked to the second, third and fourth output ports 642, 643, and 644 and toward a local drop Demux. Here, if transmission is determined to be only along the path 631 linked to the second output port 642 and the other paths 632, 633 and 634 are blocked, typical one-to-one connection of the cross-connect apparatus can be achieved.

As another example, portions of signals, having wavelengths $\lambda_1, \lambda_2, \lambda_3, \ldots, \lambda_n$, may be input from first, third and fourth input ports 621, 623 and 624 and a local add Mux to the WSS connected to the second output port 642. Here, if the signals having wavelengths $\lambda_1$ and $\lambda_2$ input from the first input port 621 to the second output port 642, the portions of signals, having wavelengths $\lambda_3$ and $\lambda_4$, input from the third input port 623, and the portions of signals, having wavelengths $\lambda_5, \ldots, \lambda_N$, input from the local add Mux are output, and signals or portions of signals, having particular wavelengths, input from the fourth input port 624 are blocked completely, and then a one-to-one connection can be achieved.

Multi-casting involves transmitting a single signal along a common path by a predetermined distance and splitting the signal at a split node so as to transmit multiple signals to different destinations, rather than transmitting a plurality of signals from a single starting point to different destinations, thereby reducing network traffic.

An optical multi-casting function in a multi-dimensional cross-connect apparatus according to the present invention will be described. Since all the signals having wavelengths $\lambda_1, \lambda_2, \lambda_3, \ldots, \lambda_n$, which are copied in the first input port 621, are linked to the second, third and fourth ports and toward the local drop Demux that form routes 631, 632 633, and 634, if portions of the input signals, having wavelengths $\lambda_1$ and $\lambda_2$, from the first input port 621 are transmitted to the second, third and fourth WSSs 642, 643, and 644, and the path toward the local drop Demux 634 is blocked, then simultaneous optical multi-casting along three paths can be achieved.

In addition, in a multi-dimensional cross-connect apparatus according to the present invention, optical multi-casting can be achieved by a control operation in an electrical switch. For example, after the portion having wavelength $\lambda_1$ in the signal input to the first input port 621 is demultiplexed and converted into an electrical signal in the receiver, the electrical signal is copied into three signals in an electrical switch and linked to, and transmitted to the second, third, and fourth output ports 642, 643, and 644, under WSS control. In this process, a portion having a wavelength that may be the same as or different from the wavelength $\lambda_1$ used in the first input port 621 can be used.

By performing such a series of processes as described above, a multi-dimensional cross-connect apparatus according to the present invention may connect a signal input from an arbitrary input port to an arbitrary output port (one-to-one connection) or to multiple output ports (one-to-multiple connection). In addition, this operation can be performed in the electrical domain or the optical domain, and wavelength conversion is possible in the electrical domain. This will be described in more detail below with reference to FIGS. 8 through 11.

The operation of a WSS according to an embodiment of the present invention will be described with reference to FIGS. 7A and 7B.

Figure 7A:
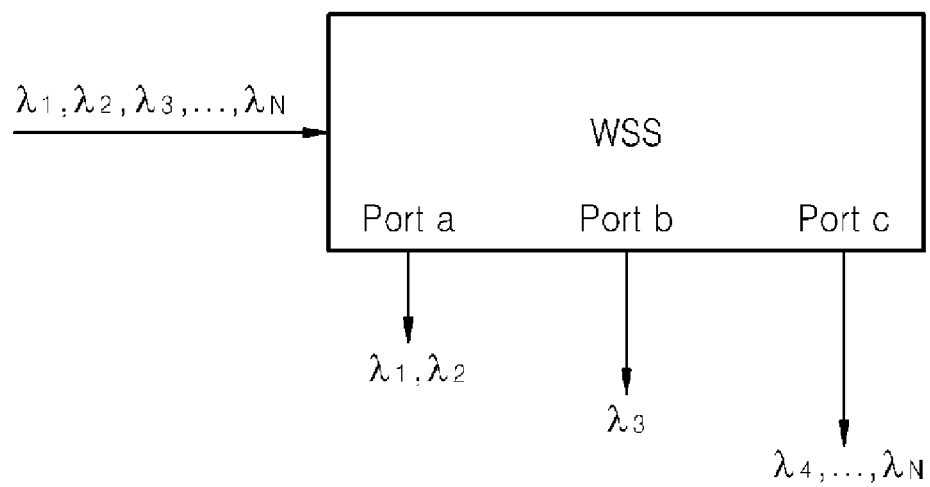
FIGS. 7A and 7B respectively illustrate dropping and addition operations of a wavelength selective switch.

As shown in FIG. 7A, the WSS may switch arbitrary wavelength inputs from a single input port to multiple output ports. For example, when portions having wavelengths $\lambda_1, \lambda_2, \lambda_3, \ldots, \lambda_n$ are input to an input port, the WSS may transmit the portions having wavelengths $\lambda_1$ and $\lambda_2$ to port a, the portion having wavelength $\lambda_3$ to port b, and the portions having wavelengths $\lambda_4, \ldots, \lambda_n$ to port c, wherein the ports a, b, and c are output ports.

Figure 7B:
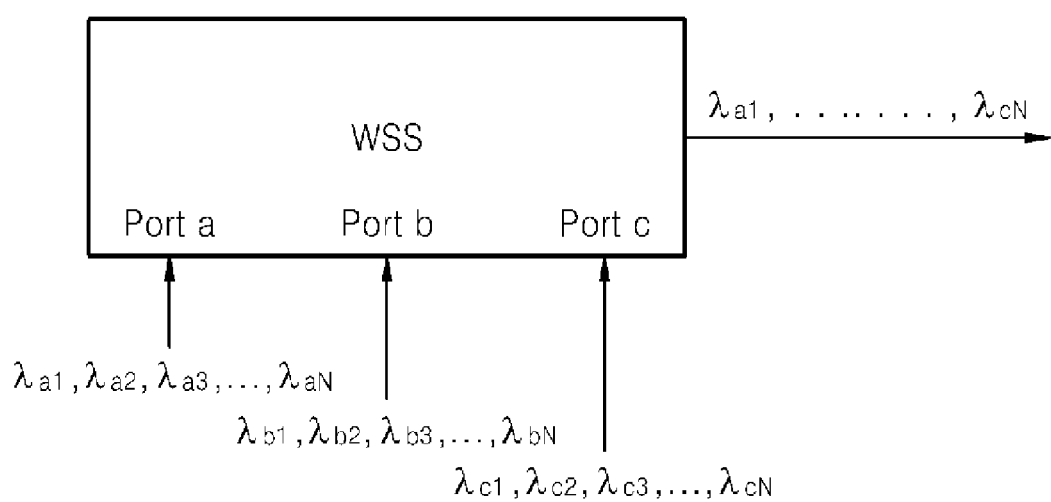

Alternatively, as shown in FIG. 7B, the WSS may switch an arbitrary wavelength input to multiple input ports to a single output port so that the arbitrary wavelength input selectively passes the single output port. For example, when portions having wavelengths $\lambda_1, \lambda_2, \lambda_3, \ldots, \lambda_n$ are input to each of the ports a, b and c, the WSS may pass the portion having wavelength $\lambda_1$ from the port a, the portions having wavelengths $\lambda_2$ and $\lambda_3$ from the port b, and the portion having wavelength $\lambda_n$ from the port c through a single output port and block the other wavelengths, wherein the ports a, b, and c are input ports.

Figure 8:
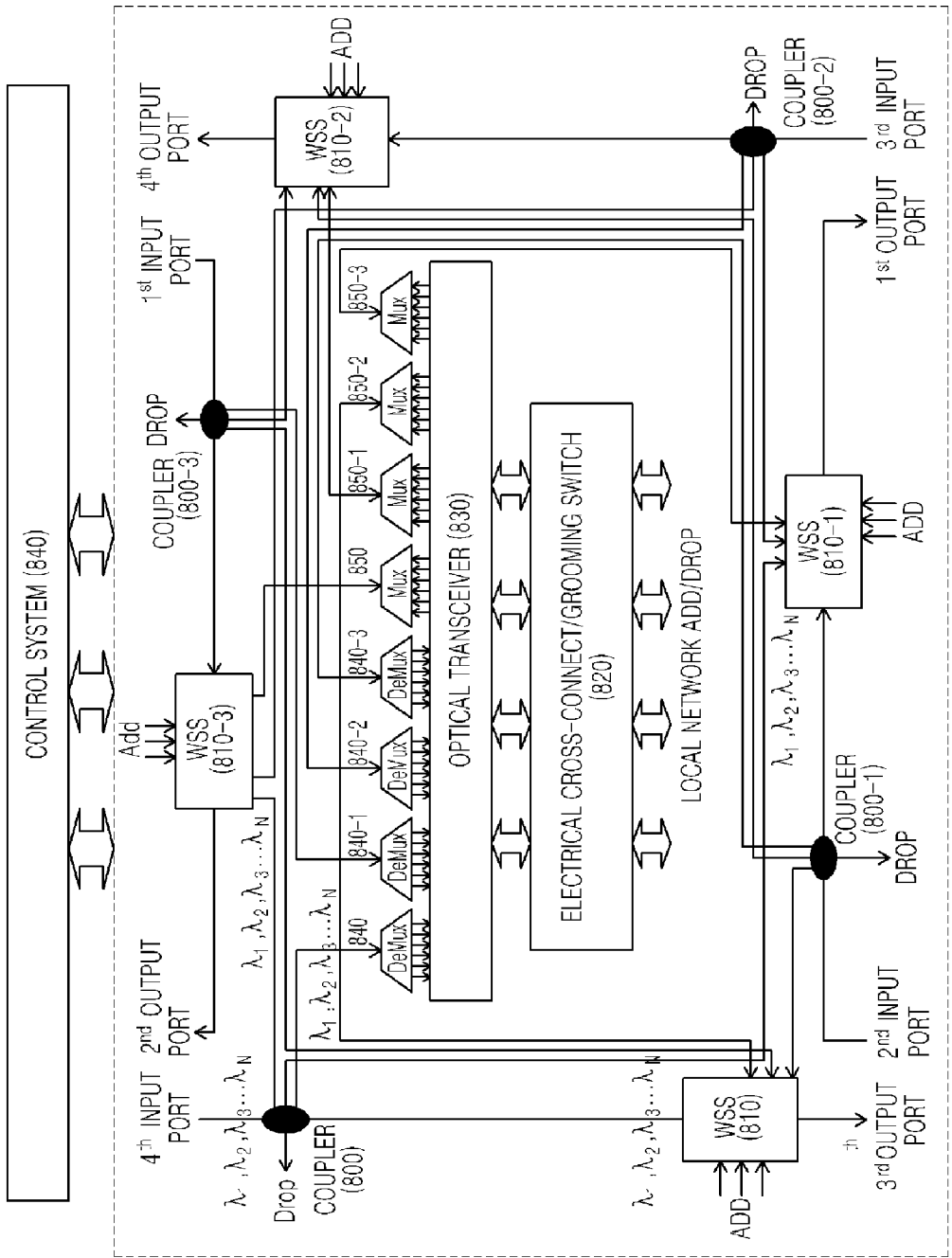
FIG. 8 illustrates an exemplary structure of a hub node using a multi-dimensional cross-connect apparatus according to an embodiment of the present invention.

FIG. 8 illustrates an exemplary structure of a hub node using a multi-dimensional cross-connect apparatus according to an embodiment of the present invention. In other words, FIG. 8 illustrates an example of switching a signal received through a single input port to three different destinations and enabling the hub node to drop and/or add the signal to a local network.

In FIG. 8, the multi-dimensional cross-connect apparatus includes optical couplers 800, 800-1, 800-2, and 800-3; WSSs 810, 810-1, 810-2, and 810-3; demultiplexers 840, 840-1, 840-2, and 840-3; multiplexers 850, 850-1, 850-2, and 850-3; an electrical cross-connection/grooming switch 820; an optical transceiver 830; and a control system 840.

As shown in FIG. 7B, the WSS may selectively switch an arbitrary wavelength input of multiple input ports to a single output port. In an embodiment of the present invention, a wavelength division multiplexed (WDM) optical signal input through a 4th input port is split into three paths by the optical coupler 800, 800-1, 800-2 and 800-3 and then transmitted to the WSS 810, the WSS 810-3, and the WSS 810-1.

In addition, the WSS can adjust the magnitude of an input signal according to wavelengths and determine whether to block or transmit the signal. According to a command from the control system 840, each WSS 810, 810-1, 810-2, and 810-3, which respectively corresponds to the four cardinal directions, passes the output signals to be transmitted and blocks the other signals.

Figure 9:
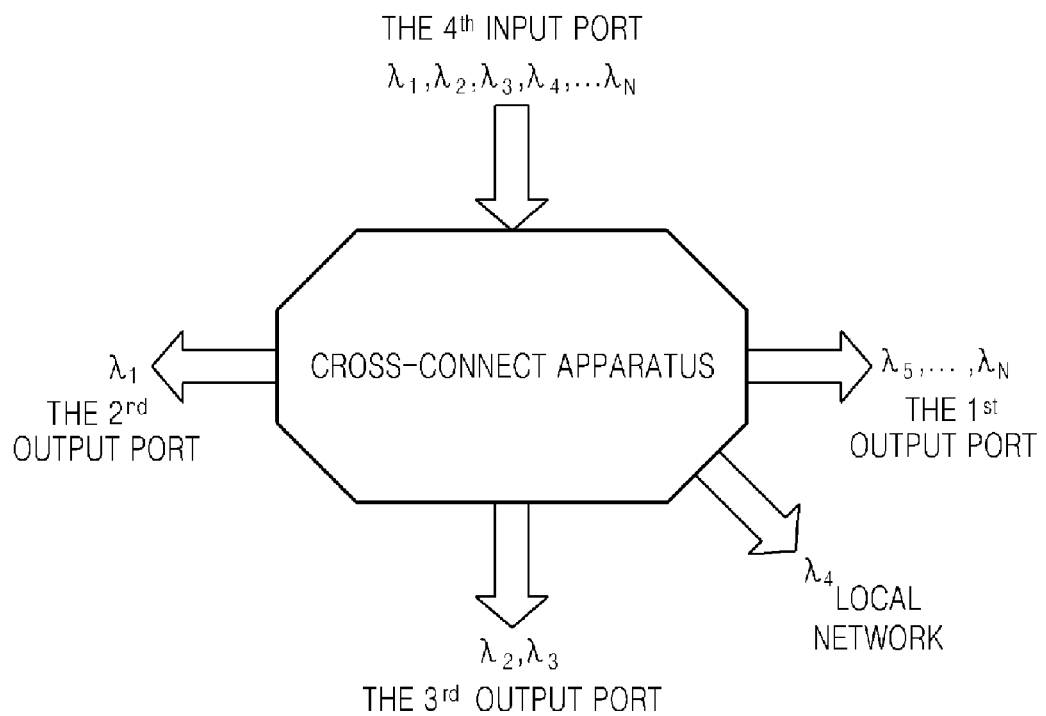
FIG. 9 illustrates a uni-cast cross-connect function in a hub node using a multi-dimensional cross-connect apparatus according to an embodiment of the present invention.

FIG. 9 illustrates a uni-cast cross-connect function of a hub node in a multi-dimensional cross-connect apparatus according to an embodiment of the present invention.

As shown in FIG. 9, when portions having wavelengths $\lambda_1, \lambda_2, \lambda_3, \ldots, \lambda_n$ are input from the north (which corresponds to the $4^{th}$ input of FIG. 8), the portion having wavelength $\lambda_1$ is switched to the west (which corresponds to the $2^{nd}$ output of FIG. 8), the portions having wavelengths $\lambda_2$ and $\lambda_3$ are switched to the south (which corresponds to the $3^{rd}$ output of FIG. 8), the portions having wavelengths $\lambda_5, \ldots, \lambda_n$ are switched to the east (which corresponds to the $1^{st}$ output of FIG. 8), the portions having $\lambda_1, \lambda_2, \lambda_3, \ldots, \lambda_n$ are transmitted to the electrical cross-connection/grooming switch (820 in FIG. 8) for dropping and adding the signal to a local network, and only the portion having wavelength $\lambda_4$ is selectively transmitted to the local network.

The optical transceiver does not send the portions having non-selective wavelengths from among split signals toward the electrical cross-connection/grooming switch 820.

In addition, an additional port can be used at each coupler near the four cardinal inputs (the $1^{st}$, $2^{nd}$, $3^{rd}$ and $4^{th}$ inputs of FIG. 8) in order to drop a signal from the local network without using the electrical cross-connection/grooming switch 820.

Through the above-described processes, the multi-dimensional cross-connect apparatus can perform the uni-cast cross-connect function. In addition, unlike the conventional art, there is no need to split all signals according to wavelengths for optical switching of the signals, and thus deterioration of signals caused by filtering can be prevented.

Figure 10:
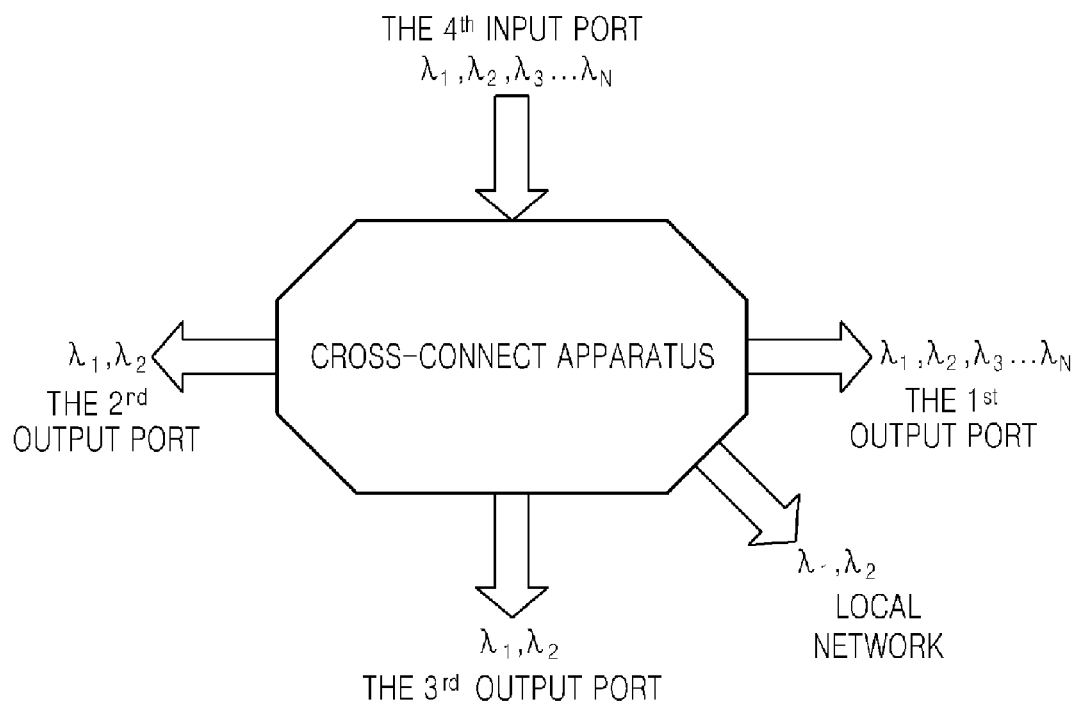
FIG. 10 illustrates an embodiment of performing a uni-cast/multi-cast hybrid cross-connect function in a hub node using a multi-dimensional cross-connect apparatus according to an embodiment of the present invention.

FIG. 10 illustrates an embodiment of performing a uni-cast/multi-cast hybrid cross-connect function in a hub node in a multi-dimensional cross-connect apparatus according to an embodiment of the present invention.

A multi-cast function provided by a multi-dimensional cross-connect apparatus according to the present invention is performed by using the following processes.

The multi-cast function will be described with reference to FIG. 8. A WDM optical signal input through the $4^{th}$ input port is split into three paths by the optical coupler 800, 800-1, 800-2 and 800-3, and then transmitted to the $3^{rd}$ output WSS 810, the $2^{nd}$ output WSS 810-3, and the $1^{st}$ output WSS 810-1.

When portions having wavelengths $\lambda_1, \lambda_2, \lambda_3, \ldots, \lambda_n$ are input through the $4^{th}$ input port, in response to a command from the control system 840, the portions having wavelengths $\lambda_1$ and $\lambda_2$ are transmitted to the $2^{nd}$ and $3^{rd}$ output ports, and the portions having wavelengths $\lambda_1, \lambda_2, \lambda_3, \ldots, \lambda_n$ are transmitted to the electrical cross-connection/grooming switch 820 and the $1^{st}$ output port.

Only the portions having wavelengths $\lambda_1$ and $\lambda_2$ are selectively transmitted toward the local network. In this case, the portions having wavelengths $\lambda_1$ and $\lambda_2$ are transmitted to all the $1^{st}$, $2^{nd}$ and $3^{rd}$ output ports and toward the local network so that the multi-cast function is performed. Meanwhile, the portions having wavelengths $\lambda_2, \ldots, \lambda_n$ are switched only to the $1^{st}$ output port, so that the uni-cast function is performed.

Thus, the WSS can determine whether to selectively pass or block the portions having wavelengths $\lambda_1, \lambda_2, \lambda_3, \ldots, \lambda_n$ in response to a command from the control system 840, and thus it is obvious that multi-casting for all input channels can be performed.

Next, the processes of optical to electrical conversion and electrical to optical conversion of a signal to be dropped or added in the local network will be described.

A WDM optical signal which has been split for the electrical cross-connection/grooming switch 820 is demultiplexed into portions having specific wavelengths by the demultiplexers 840, 8401-1, 840-2, and 840-3, and then converted into an electrical signal in the optical receiver 830.

The optical transceiver does not send the portions having non-selective wavelengths from among split signals toward the electrical cross-connection/grooming switch 820.

In addition, the optical receiver 830 reconstructs the electrical signal using restoring data and clocks from the degraded optical signal during the process of converting demultiplexed optical signals into electrical signals according to wavelengths.

The reproduced electrical signals are transmitted to the electrical cross-connect/grooming switch 820.

After classifying the electrical signals transmitted from the optical transceiver 830 into a signal to be dropped into the local network and signals to be retransmitted to the east, west and south output ports, the electrical cross-connection/grooming switch 820 then drops the signal into the local network, and recombines the retransmitted signals from the $1^{st}$, $2^{nd}$, and $3^{rd}$ output ports with a signal to be added to the local network, thereby reconstructing high-speed signals for optical transmission.

The reconstructed signals are transmitted as high-speed signals to the optical transceiver 830 based on a command from the control system 840, are converted into optical signals in the optical transceiver 830, are subjected to WDM by the multiplexers 850, 850-1, 850-2, and 850-3, and then transmitted to each WSS 810, 810-1, 810-2, and 810-3.

In this process, low-speed electrical digital hierarchy signals are recombined in the electrical cross-connection/grooming switch 820 so that bandwidth can be used efficiently.

In addition, the multi-dimensional cross-connect apparatus according to an embodiment of the present invention performs wavelength conversion without using a separate wavelength converter, thereby increasing the availability of network resources.

Figure 11:
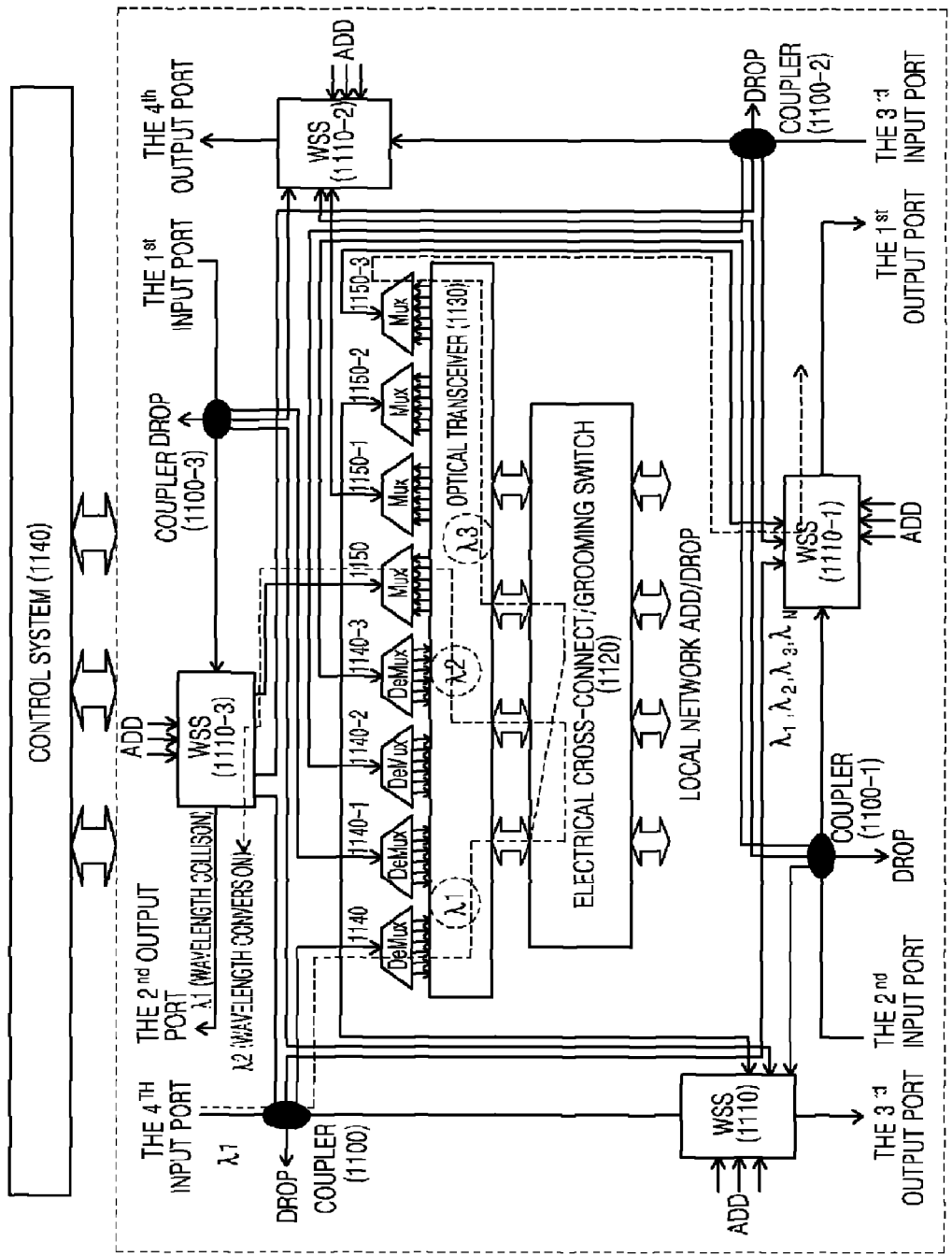
FIG. 11 illustrates another example of a network node structure using a multi-dimensional cross-connect apparatus according to an embodiment of the present invention.

FIG. 11 illustrates another example of a network node structure using a multi-dimensional cross-connect apparatus according to an embodiment of the present invention.

Referring to FIG. 11, when it is intended to transmit the portion having wavelength $\lambda_1$ input from the $4^{th}$ input port to the $2^{nd}$ output port, if the portion having wavelength $\lambda_1$ is already in use in the $2^{nd}$ output port, a wavelength collision occurs, so that the signal cannot be transmitted.

In this case, a WSS 1110-3 near the $2^{nd}$ output port blocks the portions having wavelength $\lambda_1$ input from the north.

The wavelength $\lambda_1$ is selected from among the WDM optical signals dropped from the local network and converted into electrical signals in the optical transceiver 1130. Next, the electrical signals are linked to a $\lambda_2$ optical transceiver connected to the $2^{nd}$ output port. As a result, the portion having wavelength $\lambda_1$ from the $4^{th}$ input port can be transmitted to the $2^{nd}$ output port after wavelength conversion to $\lambda_2$.

In this process, since the optical transceiver 1130 installed in a node is used, there is no need to install an additional wavelength converter.

In addition, the electrical cross-connection/grooming switch 1120 has a function of electrically copying signals. Thus, using this function, the portion having wavelength $\lambda_1$ from the $4^{th}$ input can be transmitted to the $2^{nd}$ output port, having converted wavelength $\lambda_2$, and at the same time the portion having wavelength $\lambda_1$ can be copied in the electrical cross-connection/grooming switch 1120 and linked to a $\lambda_3$ optical transceiver 1130 connected to the $1^{st}$ output port, so that the portion having wavelength $\lambda_1$ from the $4^{th}$ input port can be converted so as to have $\lambda_3$ and is then transmitted to the $1^{st}$ output port.

Thus, multi-casting can be achieved with the electrical cross-connection/grooming switch and also said method solves the conventional problems such as a wavelength collision or signal deterioration which may occur when multi-casting is performed. A portion having a specific wavelength, which is to be multi-casted, may be the same as or differ from the input portion wavelength.

Figure 12A:
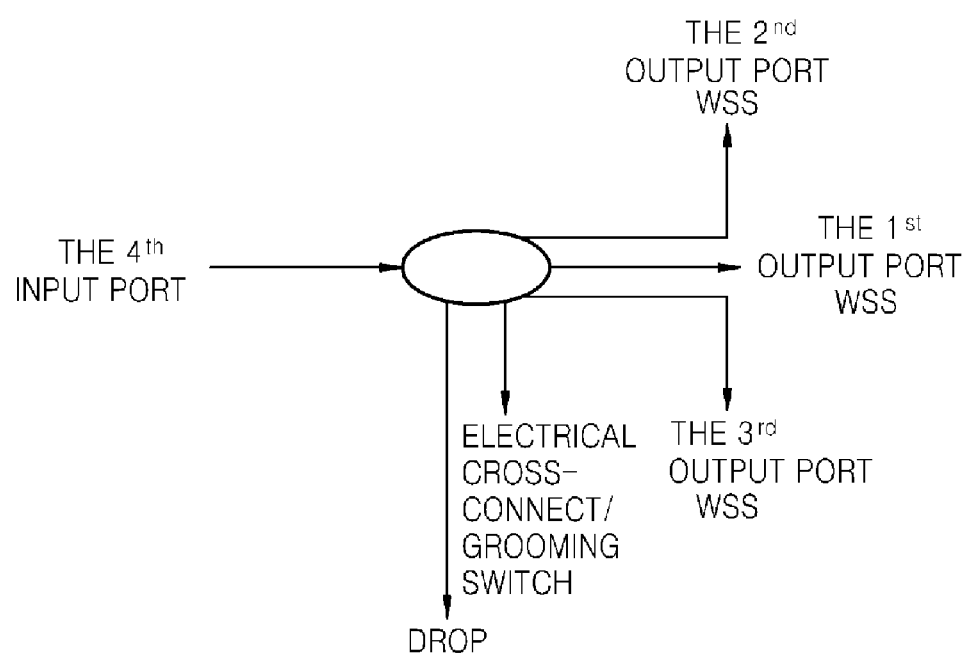
FIGS. 12A and 12B illustrate another example of a network node structure using a multi-dimensional cross-connect apparatus according to an embodiment of the present invention.
Figure 12B:
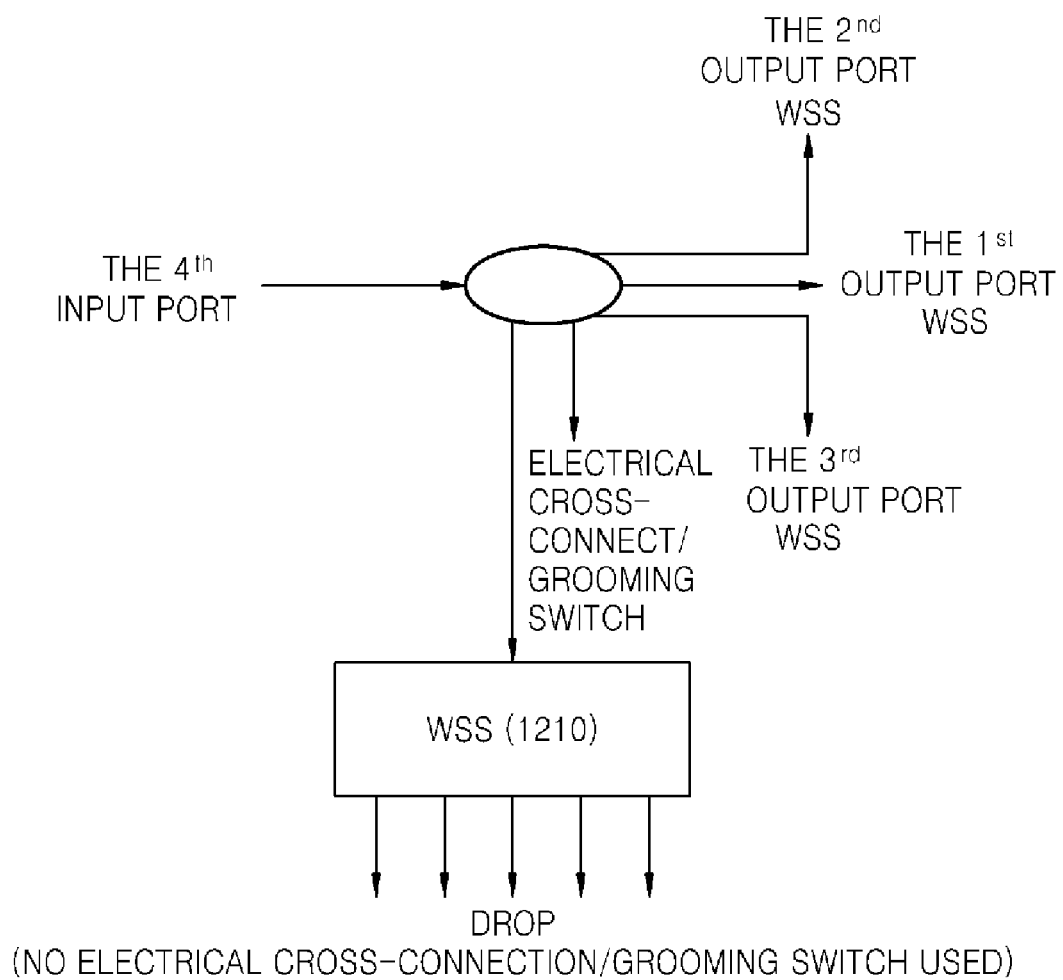

FIGS. 12A and 12B illustrate another example of a network node structure using a multi-dimensional cross-connect apparatus according to an embodiment of the present invention.

FIG. 12A is an enlarged view of the optical coupler 800 of FIG. 8.

In order to drop the signal into the local network without the electrical cross-connection/grooming switch 820, an additional port can be used at each coupler near the four cardinal input ports. Also, an additional WSS 1210 may be connected to the port, as shown in FIG. 12B, so as to selectively drop an optical signal.

Although, in the above embodiments, the principle of switching to different directions has been described with reference to a signal from the $4^{th}$ input port, the same switching principle applies to the inputs from the $1^{st}$, $2^{nd}$ and $3^{rd}$ input ports.

In addition, although in the above embodiments, 4-dimensional switching using a single input, three outputs, and a single drop is described for convenience of explanation, a multi-dimensional cross-connect apparatus can be constructed by increasing/reducing splitting ratio of the optical coupler and the number of WSSs. In addition, in order to amplify signals or compensate for optical signals, an optical amplifier and a dispersion compensation optical fiber may be used between optical components.

In addition, a WDM optical network can be established by constructing network nodes using the multi-dimensional cross-connect apparatus according to the present invention and connecting the network nodes with an optical fiber and an optical amplifier.

Figure 13:
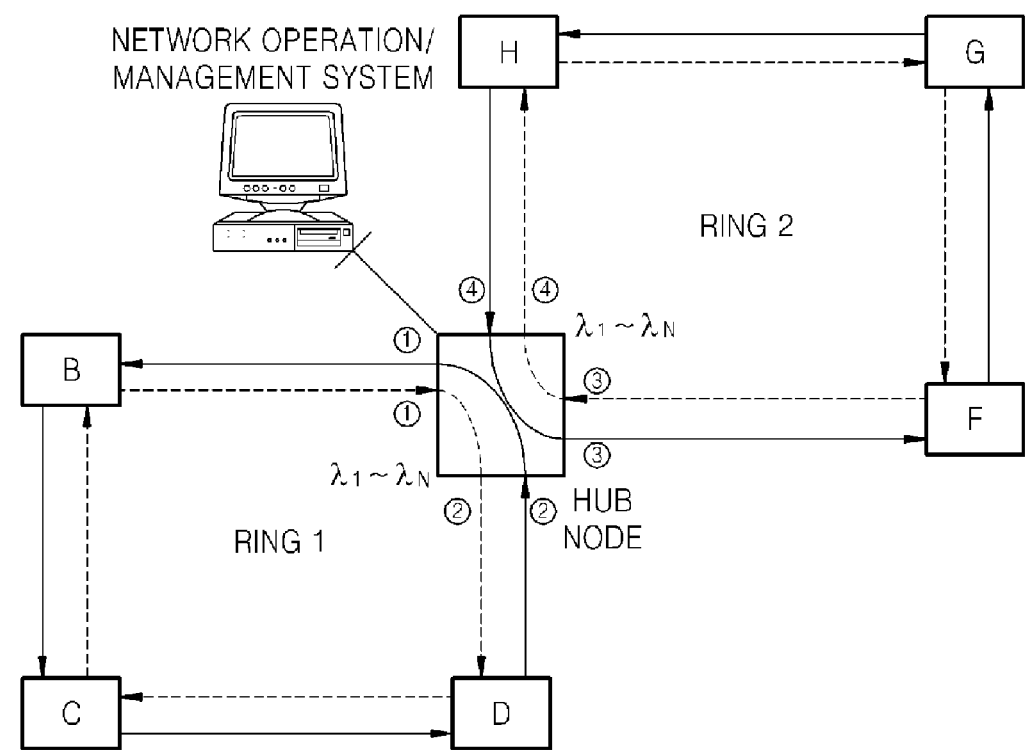
FIG. 13 illustrates a multi-ring network implemented by using a multi-dimensional cross-connect apparatus according to an embodiment of the present invention in a hub node.

FIG. 13 illustrates a multi-ring network implemented by using a multi-dimensional cross-connect apparatus according to an embodiment of the present invention in a hub node. The input/output port numbers indicated around the hub node correspond to the input/output port numbers in FIG. 6. When there is no data transmission between a first ring network 1310 and a second ring network 1320, the hub node sets all the wavelength portions to be only transmitted into each of the first and second ring networks 1310 and 1320 under the control of a network operation/management system.

Figure 14A:
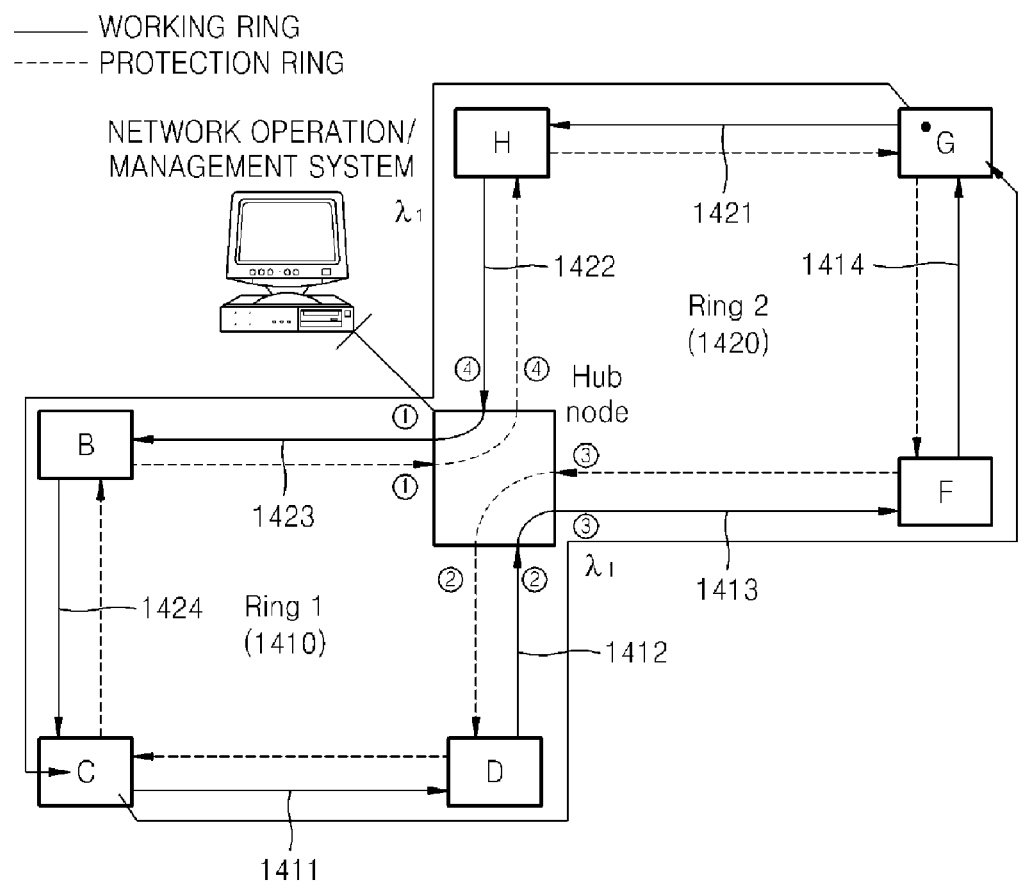
FIGS. 14A and 14B illustrate a multi-ring network operating method using a multi-dimensional cross-connect apparatus according to an embodiment of the present invention when a first ring network uses 1:1 protection and a second ring network uses 1:1 protection.
Figure 14B:
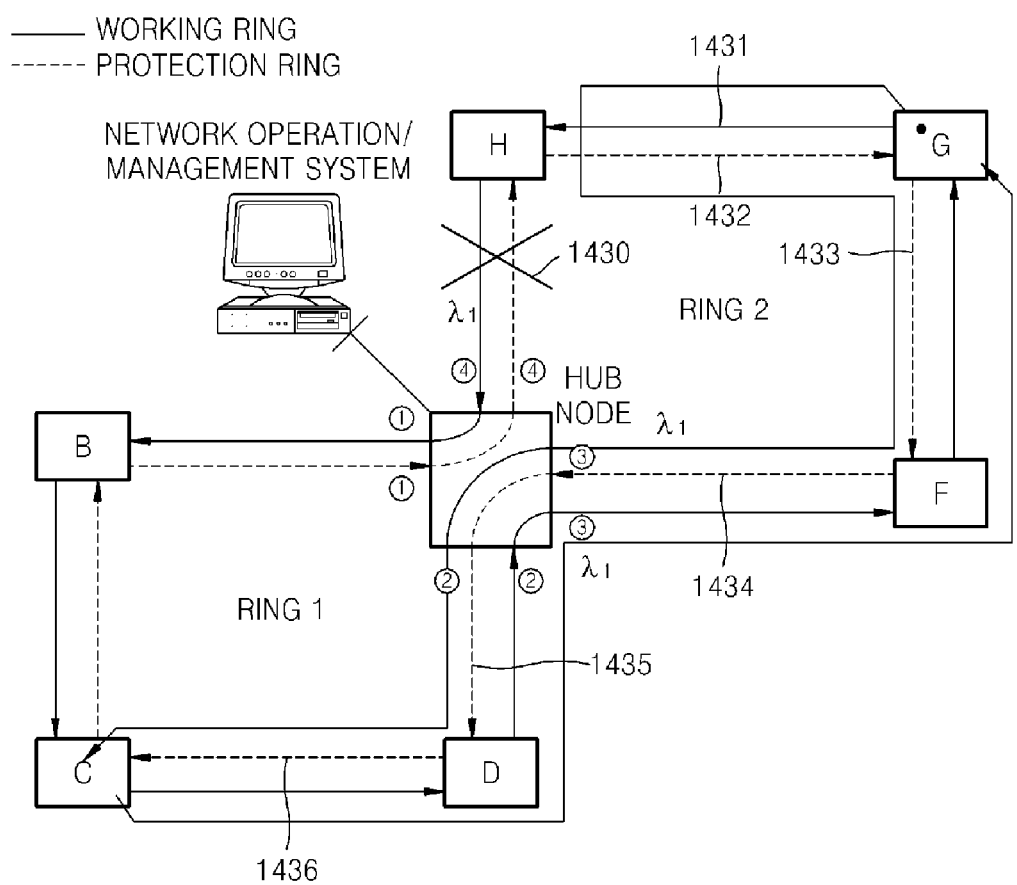

FIGS. 14A and 14B illustrate a multi-ring network operating method using a multi-dimensional cross-connect apparatus according to an embodiment of the present invention when a first ring network uses 1:1 protection and a second ring network uses 1:1 protection.

For example, when a multi-ring network is in a normal operation state, as illustrated in FIG. 14A, the hub node connects an input working ring to an output working ring and an input protection ring to an output protection ring. Here, the wavelength of a portion may not only be $\lambda_1$ but may also be any arbitrary wavelength or may be several wavelengths. In addition, the cross-connection can be achieved in either the optical domain or the electrical domain, or both in the optical and electrical domains of the multi-dimensional cross-connect apparatus of FIG. 6. The wavelength portions which are not used for cross-connection of the ring networks are switched so as to be transmitted into the nodes of each of the ring networks.

A process of cross-connecting two ring networks will be described below. From node C to node G, data is transmitted using the portion having wavelength $\lambda_1$ via node D, the hub node, and node F through working rings 1411, 1412, 1413, and 1414. Similarly, from node G to node C, data is transmitted using the portion having wavelength $\lambda_1$ via node H, the hub node, and node B through working rings 1421, 1422, 1423, and 1424.

However, as illustrated in FIG. 14B, a network failure, such as an optical fiber cutoff, as indicated by reference numeral 1430, may occur in a section of the second ring network 1420, i.e., between node H and the hub node. In this case, the data transmissions from node G to node H, the hub node, node B and node C through the working rings 1421, 1422, 1423, and

1424 are interrupted, so that node H transmits the data through a protection ring in response to a command from the network operation/management system.

Thus, data, which is transmitted from node G to node H, the hub node, node B and node C through the working rings 1421, 1422, 1423, and 1424, is transmitted by taking a detour from node G to node H through the working ring 1431 to node G, node F, the hub node, node D, and node C through protection rings 1432, 1433, 1434, 1435, and 1436.

Figure 15B:
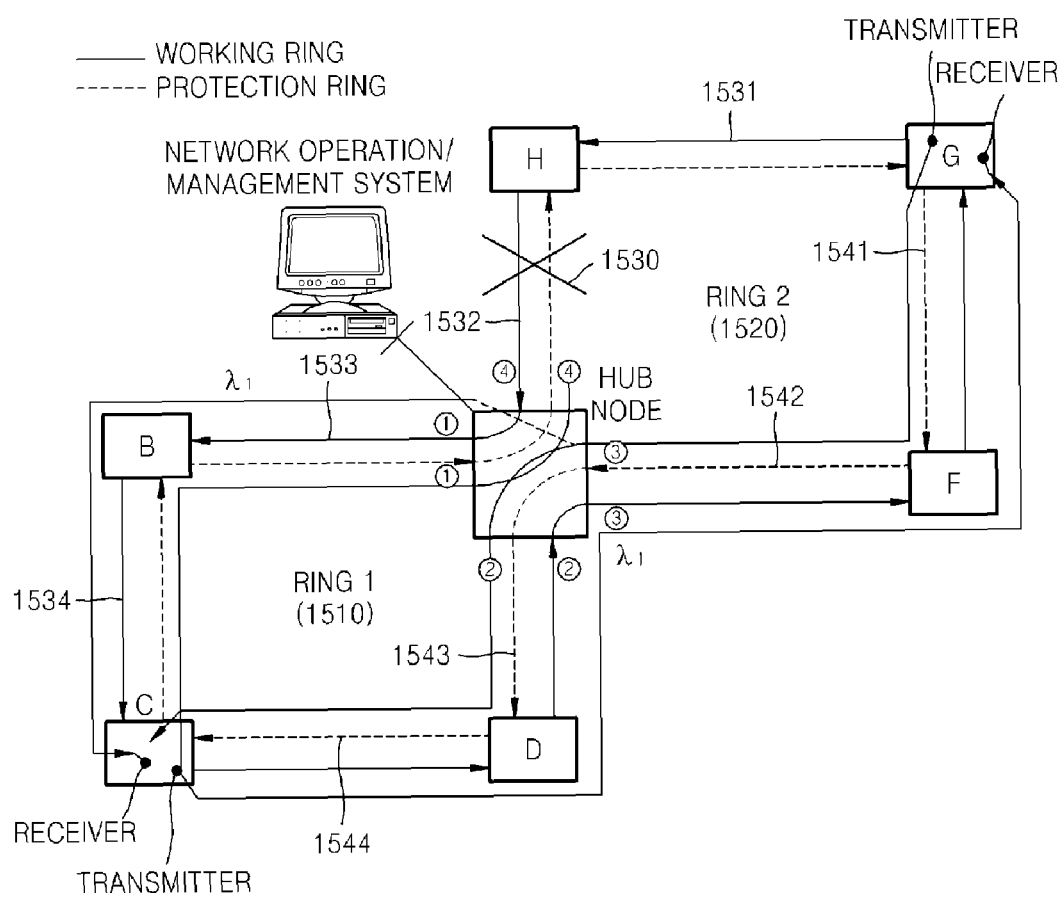
Figure 15C:
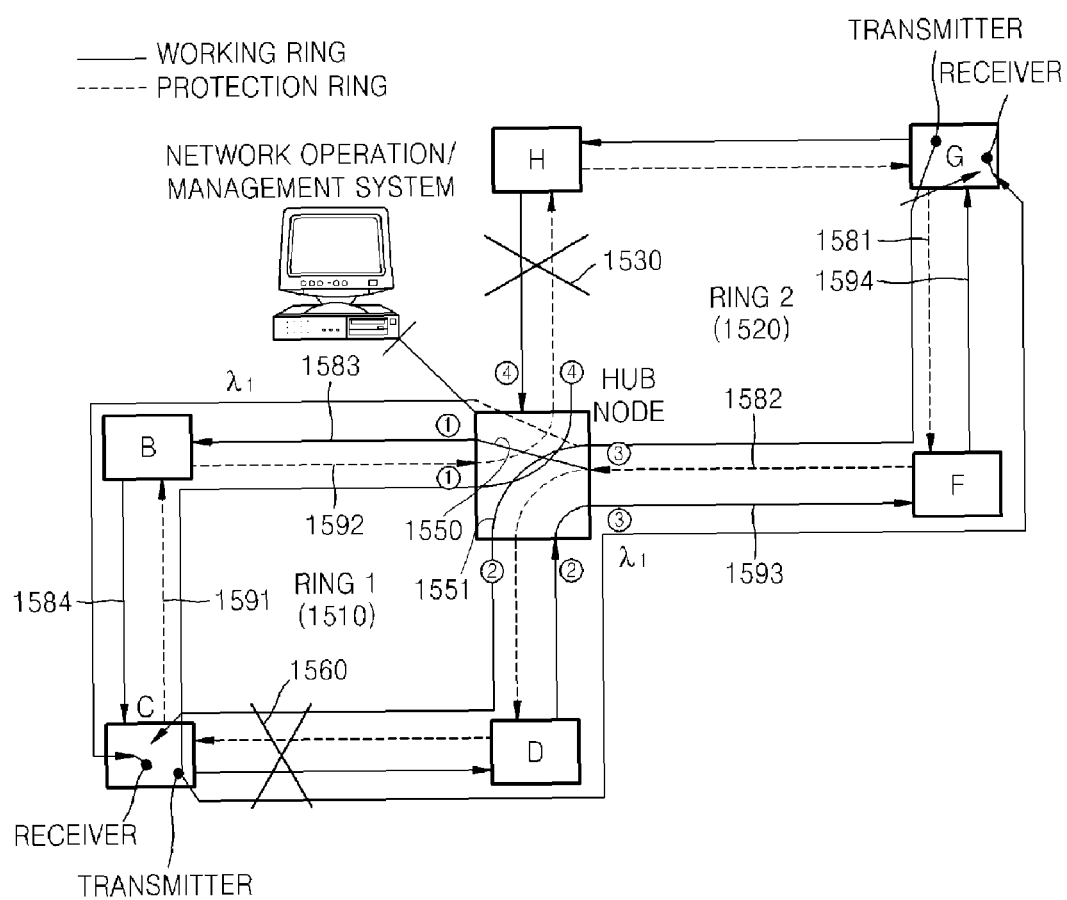

FIGS. 15A through 15C illustrate a multi-ring network operating method using a multi-dimensional cross-connect apparatus according to an embodiment of the present invention when a first ring network 1510 uses 1+1 protection and a second ring network 1520 uses 1+1 protection.

An exemplary operation in a normal state is illustrated in FIG. 15A(1). The hub node connects an input working ring to an output working ring and an input protection ring to an output protection ring. Here, a portion may have a wavelength that is not only $\lambda_1$ but may also be any arbitrary wavelength or may be several wavelengths. In addition, a cross-connection can be achieved in either the optical domain or the electrical domain, or both in the optical and electrical domains of the multi-dimensional cross-connect apparatus of FIG. 6. The wavelength portions which are not used for cross-connection of the ring networks are switched so as to be transmitted into the nodes of each of the ring networks.

A process of cross-connecting the two ring networks will be described below. From node C to node G, data is transmitted using the portion having wavelength $\lambda_1$ via node D, the hub node, and node F through working rings 1511, 1512, 1513, and 1514. In addition, the portion having the same wavelength is copied and transmitted from node C to node B, the hub node, node H, and node G through protection rings 1521, 1522, 1523, and 1524, and node G, which is a destination node, receives the portion having the wavelength transmitted from node F through the working ring 1514. Similarly, the portion having the wavelength is copied into two portions having the same wavelengths and transmitted from node G to node C through protection rings and working rings, respectively, and node C receives the portion having the wavelength transmitted from node B.

Referring to FIG. 15A(2), as another example in a normal operation state, the hub node links one of the signals, which has a higher quality, received from the input working and protection rings, to the output working and protection rings.

Here, a portion may have a wavelength that is not only $\lambda_1$ but also any arbitrary wavelength or may be several wavelengths. In addition, the cross-connection can be achieved in either the optical domain or the electrical domain, or both in the optical and electrical domains of the multi-dimensional cross-connect apparatus of FIG. 6. The portions having the wavelengths which are not used for cross-connection of the ring networks are switched to be transmitted into the nodes of each of the ring networks.

A process of cross-connecting the two ring networks will be described below. In order to transmit a signal from node C to node G, if a signal transmitted from node C to the hub node via node D through working rings has a higher quality than a signal transmitted from node C to the hub node via node B through protection rings, the hub node simultaneously links the signal from the input port No. 2 to output port Nos. 3 and 4.

In the second ring network 1520, the signal is transmitted from the hub node to node G via node F through working rings and via node H through protection rings, node G receives the signal transmitted from node F. Finally, the path from node C to node G is determined as node C→node G→hub node→node F→node G through working rings. Similarly, when a signal is transmitted from node G to node C, multi-casting is achieved from the input port No. 4 to output port Nos. 1 and 2 at the same time. The final path is determined as node G→node H→hub node→node B→node C through working rings.

However, as illustrated in FIG. 15B, a network failure, such as an optical fiber cutoff, as indicated by reference numeral 1530, may occur in a section of the second ring network 1520, i.e., between node H and the hub node.

In this case, data, which is transmitted from node G to node H, the hub node, node B and node C through the working rings 1531, 1532, 1533, and 1534, is interrupted. Thus, switching is controlled in node C, which is a destination node, so that node C receives the signal transmitted from node G via node F, the hub node and node D through protection rings 1541, 1542, 1543 and 1544.

In addition, in the hub node, the signal $\lambda_1$, which is usually linked from the input port No. 3 to the output port No. 2, is linked to the output port No. 1 using the multi-casting function, as indicated by reference numeral 1550 in FIG. 15C. Thus, a portion having the wavelength $\lambda_1$ input to the input port No. 3 is simultaneously linked to the output port No. 2 and the output port No. 1. As described above, by using such a multi-casting function, a signal linked from the second ring network 1520 to the first ring network 1510, can be provided with the 1+1 protection function, despite a network failure between node H and the hub node.

Thus, the network can also be protected even if an additional failure, as indicated by reference numeral 1560, occurs in the first ring network 1510, as illustrated in FIG. 15C. In the case where failures occur between node H and the hub node and between node D and node C, as indicated by reference numerals 1530 and 1560, if the hub node links the input port No. 3 only to the output port No. 2, and does not provide multi-casting by linking the input port No. 3 to both the output port No. 1 and the output port No. 2, the two paths from node G, which is a starting node, and to node C, which is a destination node, are interrupted, and thus data cannot be transmitted.

However, the hub node provides multi-casting from the input port No. 3 to both the output port No. 1 and the output port No. 2, as indicated by reference numerals 1550 and 1551, and data can be transmitted from node G to node C via node F (through the protection ring 1581), hub node (through the protection ring 1582), node B (through the working ring 1583), and node C (through the working ring 1584).

In the case of transmitting data from node C to node G, since data transmissions between node C and node D and between the hub node and node H, as indicated by reference numerals 1560 and 1530, are interrupted, if the hub node is set to switch the portion having wavelength $\lambda_1$ input to the input port No. 1 to the output port No. 3, the data can be transmitted from node C to node B (through the protection ring 1591), the hub node (through the protection ring 1592), node F (through the working ring 1593), and node G (through the working ring 1594).

FIGS. 16A through 16E illustrate a multi-ring network operating method using a multi-dimensional cross-connect apparatus according to an embodiment of the present invention when a first ring network uses 1:1 protection and a second ring network uses 1+1 protection.

Figure 16A:
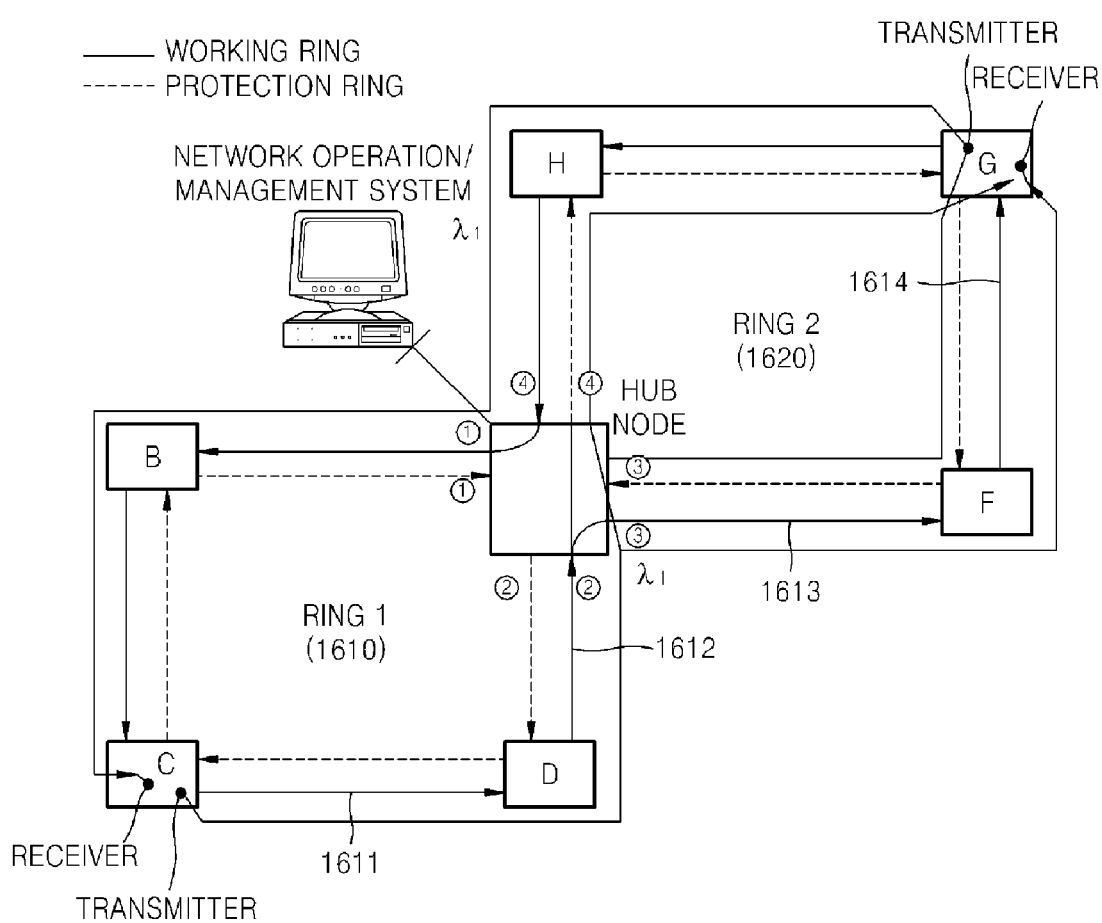
FIGS. 16A through 16E illustrate a multi-ring network operating method using a multi-dimensional cross-connect apparatus according to an embodiment of the present invention when a first ring network uses 1:1 protection and a second ring network uses 1+1 protection.

An exemplary operation in a normal state is illustrated in FIG. 16A.

When connecting the second ring network 1620 using 1+1 protection network to the first ring network 1610 using 1:1 protection network, the hub node receives the same signals from the working ring and the protection ring of the second ring network 1620, and thus the hub node may be controlled so that only one from the two received signals are linked to the first ring network 1610 using 1:1 protection network.

In addition, for connection from the first ring network using a 1:1 protection network 1610 to the second ring network using a 1+1 protection network 1620, the working ring of the 1:1 protection network 1610 is simultaneously linked to the working ring and the protection ring of 1+1 protection network 1620 through signal copying.

In other words, a portion having wavelength $\lambda_1$ is linked from the input port No. 4 to the output port No. 1 and the portion having wavelength $\lambda_1$ received through the input port No. 2 is copied and simultaneously transmitted to the output port No. 3 and the output port No. 4. Here, the portion may have a wavelength that is not only $\lambda_1$ but may also be any arbitrary wavelength or may be a variety of wavelengths. In addition, the cross-connection can be achieved in either the optical domain or the electrical domain, or both in the optical and electrical domains of the multi-dimensional cross-connect apparatus of FIG. 6.

The wavelength portions which are not used for cross-connection of the ring networks are switched so as to be transmitted into the nodes of each of the ring networks. Thus, a signal is transmitted from node C to node G via node D, the hub node, and node F through the working rings 1611, 1612, 1613 and 1614 using the wavelength $\lambda_1$.

In addition, the same signal being transmitted through the working rings is transmitted from node C to node D, the hub node (protection ring), node H (protection ring), and node G. Node G receives the signal transmitted from node F. Similarly, from node G to node C, a signal or data is transmitted using a portion having the wavelength $\lambda_1$ via node H, the hub node, and node B through the working rings.

Figure 16B:
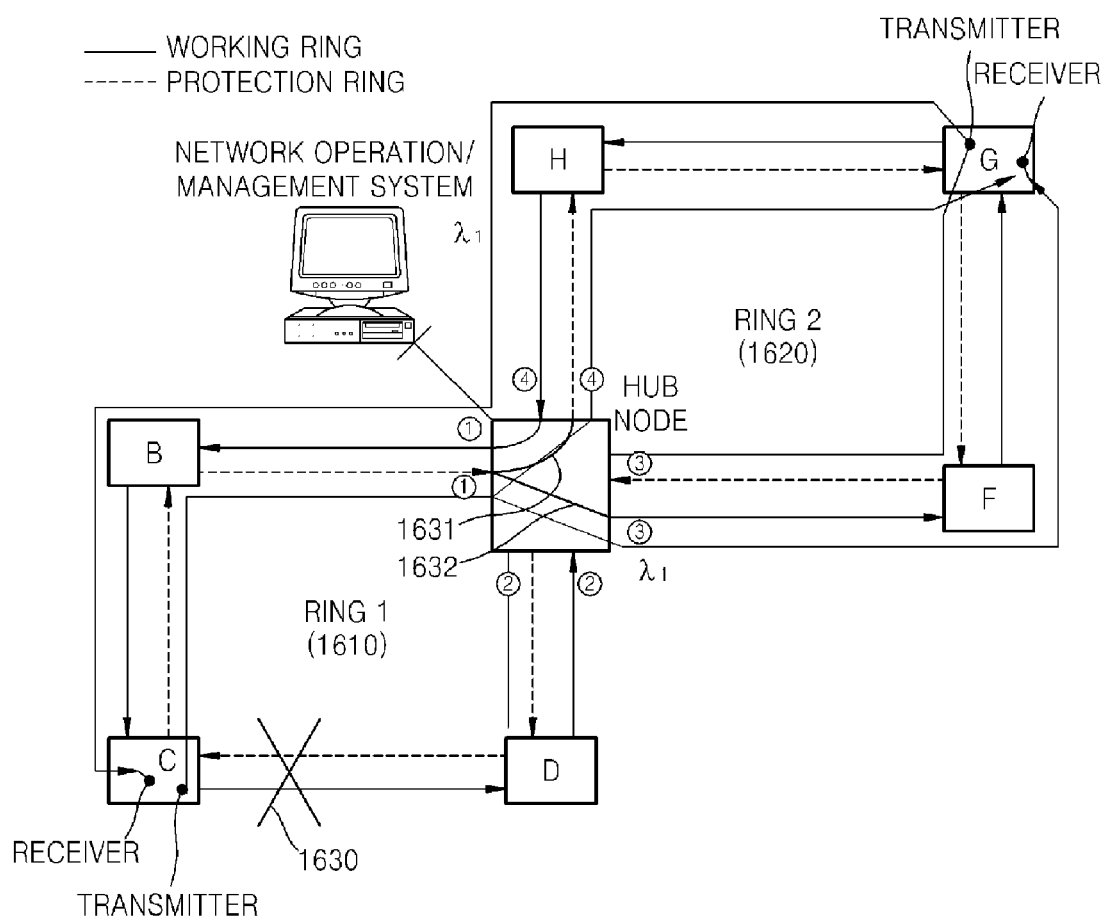

However, as illustrated in FIG. 16B, a network failure, such as an optical fiber cutoff, as indicated by reference numeral 1630, may occur in a section of the first ring network 1610, i.e., between node C and node D. In this case, data transmissions from node C to node G via node D, the hub node, and node F through the working rings 1611, 1612, 1613, and 1614, and via node D, the hub node, and node H are interrupted. Thus, the first ring network 1610 switches the path so that the signal is transmitted from node C via node B to the hub node. For connection to the second ring network 1620, the hub node is controlled so that the portion having wavelength $\lambda_1$ input to the input port No. 1 is copied into two signals and simultaneously linked to the output port No. 3 and the output port No. 4, as indicated by reference numerals 1631 and 1632. As a result, the network can be stably operated despite of the line cutoff.

Figure 16C:
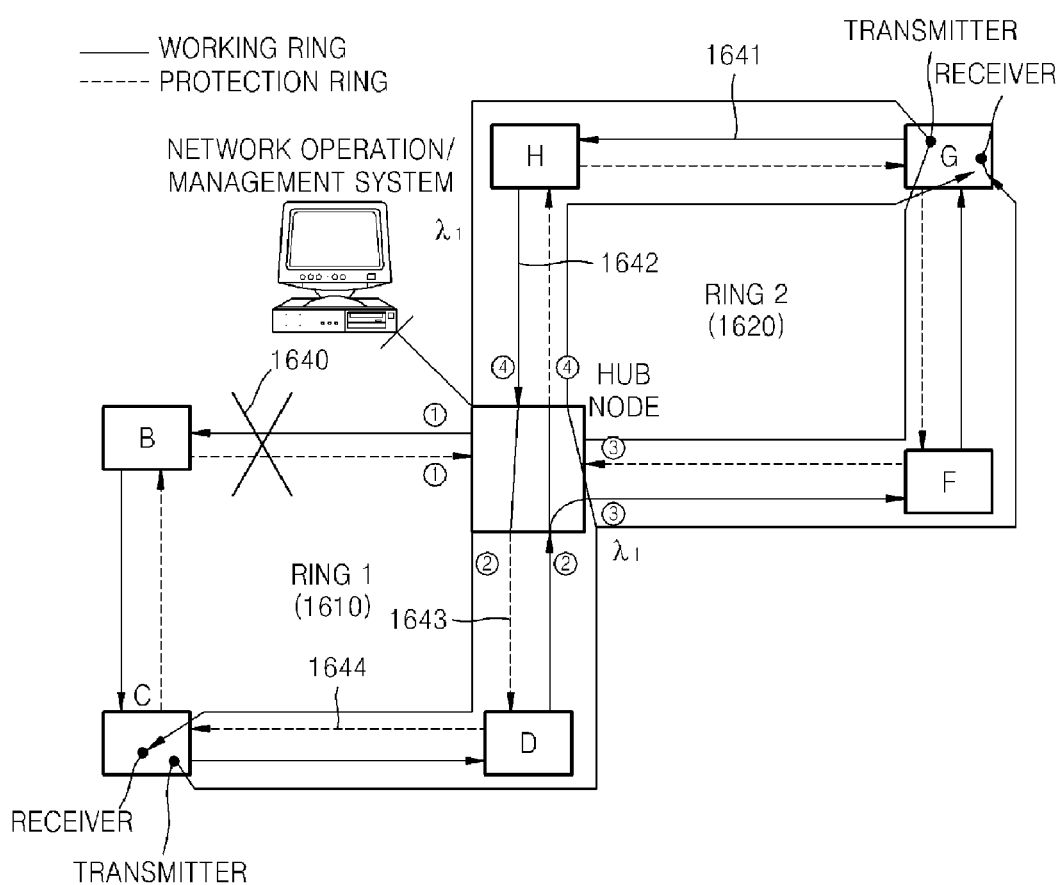

In addition, as illustrated in FIG. 16C, a network failure, such as an optical fiber cutoff, as indicated by reference numeral 1640, may occur in another section of the first ring network 1610, i.e., between node B and the hub node. In this case, the data transmission from node G to node C via node H, the hub node, and node B is interrupted. Thus, the hub node is controlled so that the portion having wavelength $\lambda_1$ input to the input port No. 4 is linked to the output port No. 2. In this case, a signal is transmitted from node G to node H (through the working ring 1641), the hub node (through the working ring 1642), node D (through the protection ring 1643), and then node C (through the protection ring 1644).

Figure 16D:
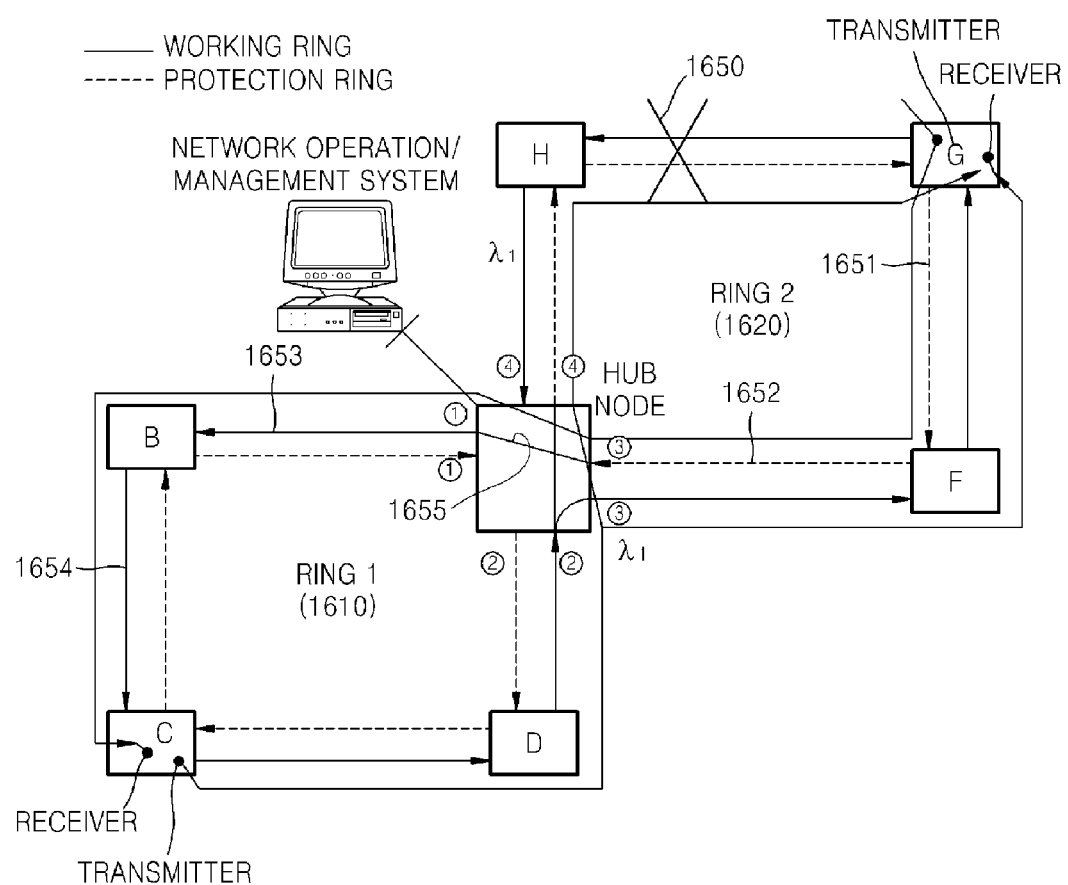

As illustrated in FIG. 16D, when failure occurs in the second ring network 1620, as indicated by reference numeral 1650, the data transmission from node G to node C via node H, the hub node, and node B is interrupted. Thus, the hub node is controlled so that the portion having wavelength $\lambda_1$ input to the input port No. 3 is linked to the output port No. 1, as indicated by reference numeral 1655. In this case, a signal is transmitted from node G to node F (through the protection ring 1651), the hub node (through the protection ring 1652), node B (through the working ring 1653), and then node C (through the working ring 1654).

Figure 16E:
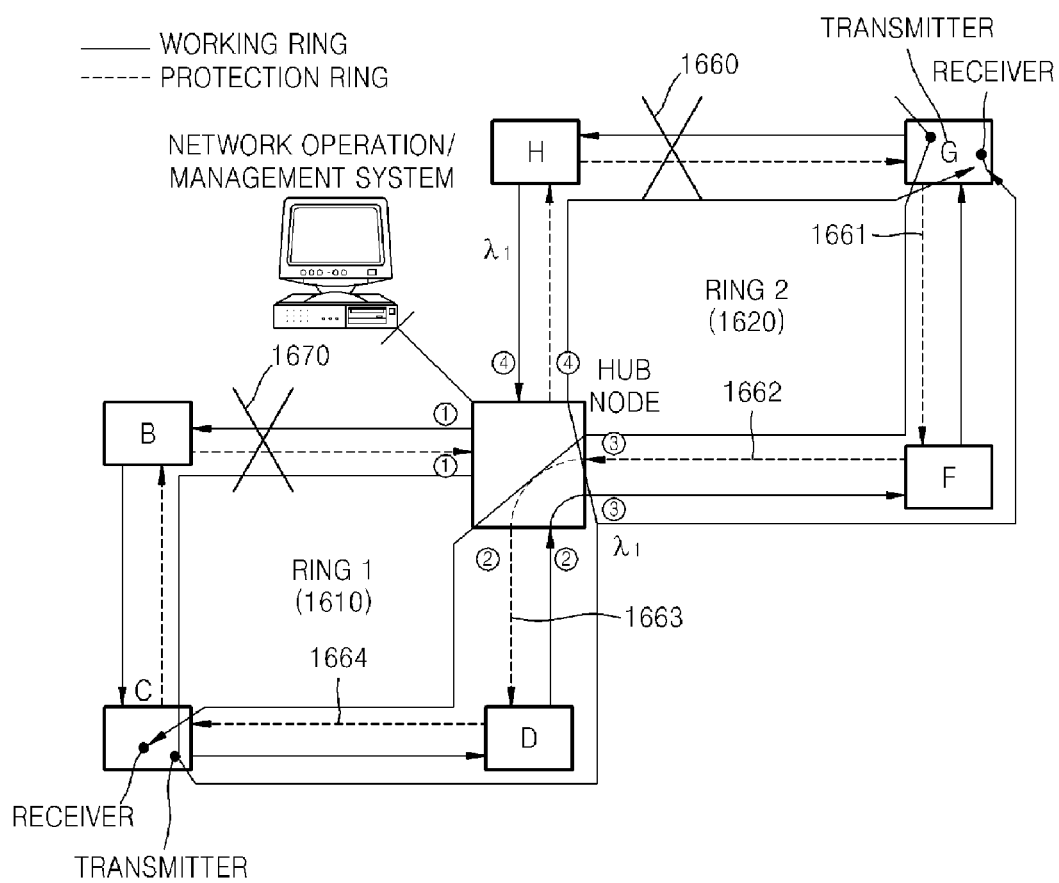

As illustrated in FIG. 16E, when failures simultaneously occur in the first ring network 1610 and the second ring network 1620, as indicated by reference numerals 1660 and 1670, the data transmission from node G to node C via node H, the hub node, and node B is interrupted. Thus, the hub node is controlled so that the portion having wavelength $\lambda_1$ input to the input port No. 3 is linked to the output port No. 2. In this case, the signal is transmitted from node G to node F (through the protection ring 1661), the hub node (through the protection ring 1662), node D (through the protection ring 1663), and then node C (through the protection ring 1664).

In the above embodiments of the present invention, the cross-connection between two ring networks has been described. However, even when a plurality of ring networks are connected to a single hub node, cross-connection between the ring networks can be achieved by increasing the number of drops and the number of WSSs in the multi-dimensional cross-connect system of FIG. 6 according to the present invention.

Figure 17:
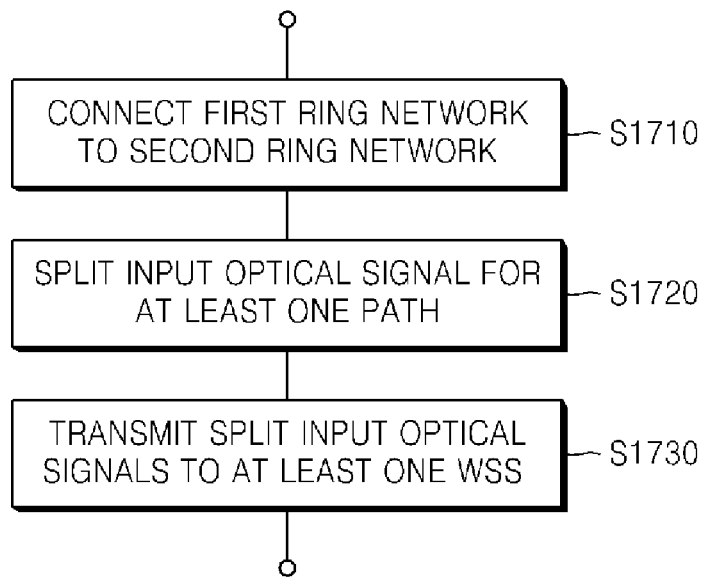
FIG. 17 is a flowchart of a multi-ring network operating method according to an embodiment of the present invention.

FIG. 17 is a flowchart of a multi-ring network operating method according to an embodiment of the present invention.

A multi-ring network operating method of cross-connecting at least two ring networks by using a multi-dimensional cross-connect apparatus according to the present application is as follows.

An input working ring and an input protection ring of a first ring network from among at least two ring networks are connected to an output working ring and an output protection ring of a second ring network. This is just an embodiment and should not be constructed as limiting the present invention. A third network and a fourth network may be additionally connected (S1710) Next, an input multi-wavelength optical signal of the first ring network is split for at least one path by using an optical coupler (S1720).

Next, the split input multi-wavelength optical signal is transmitted to at least one WSS (S1730). As a result, even when failure occurs in a network, multi-casting can be performed and data can be rapidly transmitted.

Figure 18:
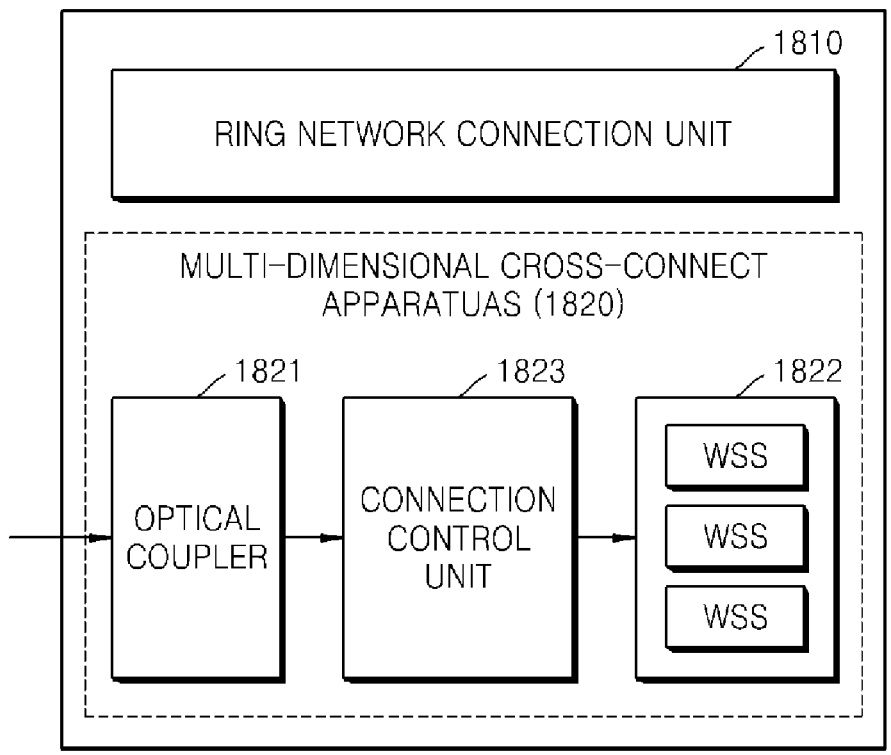
FIG. 18 illustrates a structure of a multi-ring network operating apparatus according to an embodiment of the present invention.

FIG. 18 illustrates a structure of a multi-ring network operating apparatus according to an embodiment of the present invention.

Referring to FIG. 18, the multi-ring network operating apparatus includes a ring network connection unit 1810 and a multi-dimensional cross-connect apparatus 1820. Here, it should be noticed that the ring network connection unit 1810 may be implemented in the multi-dimensional cross-connect apparatus 1820.

The multi-dimensional cross-connect apparatus 1820 includes an optical coupler 1821, at least one WSS 1822, and a connection control unit 1823.

The ring network connection unit 1810 connects a plurality of ring networks. For example, the ring network connection unit 1810 connects an input working ring and an input protection ring of a first ring network to an output working ring and an output protection ring of a second ring network.

The optical coupler 1821 splits an input multi-wavelength optical signal of the first ring network for at least one path.

The at least one WSS 1822 selectively passes at least one portion having a specific wavelength in the input multi-wavelength optical signal through at least one output of the second ring network.

The connection control unit 1823 transmits the input multi-wavelength optical signal split by the optical coupler 1821 to the at least one WSS 1822, thereby enabling uni-casting and multi-casting.

In a multi-ring operating method using a multi-dimensional cross-connection apparatus according to the present invention, a plurality of ring networks can be connected regardless of the protection method used by the ring networks, and the original protection method of each ring network can be maintained after they are connected. Thus, rapid restoration is ensured even if a network failure, such as a line cutoff, occurs. In addition, data can be smoothly transmitted between different networks so that the optical network can be efficiently used.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

In the drawings and specification, there have been disclosed typical embodiments of the invention. Although specific terms have been employed, they have been used in a generic and descriptive sense only and not for purposes of limitation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-ring network operating method of cross-connecting at least two ring networks, the method comprising:
    cross-connecting an input working ring and an input protection ring of a first ring network to an output working ring and an output protection ring of a second ring network;
    splitting an input multi-wavelength optical signal of the first ring network into at least one portion each having a specific wavelength, by using an optical coupler; and
    transmitting the input multi-wavelength optical signal to at least one wavelength selective switch, wherein the wavelength selective switch selectively passes at least one of the portions of the input multi-wavelength optical signal through at least one output of the second ring network,
    wherein a multi-casting function is provided both in an optical domain and in an electrical domain so that if the input signal does not require signal reproduction or wavelength conversion, it is cross-connected in the optical domain, and if the input signal requires signal reproduction or wavelength conversion, it is cross-connected in the electrical domain.

2. The multi-ring network operating method of claim 1, wherein the at least two ring networks are 1:1 protection networks.

3. The multi-ring network operating method of claim 1, wherein the at least two ring networks are 1+1 protection networks.

4. The multi-ring network operating method of claim 3, wherein, in the transmitting of the input multi-wavelength optical signal to at least one wavelength selective switch,
    if an failure occurs in at least one ring networks, the wavelength selective switch is controlled so that a portion having a specific wavelength is simultaneously transmitted from the protection ring of the ring network with the failure to both the working ring and the protection ring of the ring network without the failure.

5. The multi-ring network operating method of claim 3, wherein, in the transmitting of the input multi-wavelength optical signal to at least one wavelength selective switch, the wavelength selective switch is controlled to connect one of the input working ring and the input protection ring of the first ring network to both the output working ring and the output protection ring of the second ring network and to simultaneously transmit a portion having a specific wavelength from the connected one of the input working ring and the input protection ring to the output working ring and the output protection ring.

6. The multi-ring network operating method of claim 1, wherein the input working ring and the input protection ring of the first ring network are connected to the output working ring and the output protection ring of the second ring network, wherein portions having specific wavelengths are transmitted between the cross-connected working rings, and the cross-connected protection rings.

7. The multi-ring network operating method of claim 1, wherein at least one of the at least two ring networks is a 1+1 protection network.

8. The multi-ring network operating method of claim 1, wherein at least one of the at least two ring networks is a 1+1 protection network, and at least one of the at least two ring networks is a 1:1 protection network.

9. The multi-ring network operating method of claim 8, wherein, in the transmitting of the input multi-wavelength optical signal to at least one wavelength selective switch, the wavelength selective switch is controlled so that a portion having a specific wavelength is simultaneously transmitted from the working ring network of the 1:1 ring network to both the working ring network and the protection ring network of the 1+1 ring network.

10. The multi-ring network operating method of claim 8, wherein, in the transmitting of the input multi-wavelength optical signal to at least one wavelength selective switch,
    if failure occurs in the 1:1 ring network, the wavelength selective switch is controlled so that a portion having a specific wavelength is simultaneously transmitted from the protection ring of the 1:1 ring network to both the working ring and the protection ring of the 1+1 ring network.

11. The multi-ring network operating method of claim 8, wherein, in the transmitting of the input multi-wavelength optical signal to at least one wavelength selective switch, the wavelength selective switch is controlled so that a portion having a specific wavelength is simultaneously transmitted from the protection ring of the 1:1 ring network to both the working ring and the protection ring of the 1+1 ring network.

12. The multi-ring network operating method of claim 8, wherein, in the transmitting of the input multi-wavelength optical signal to at least one wavelength selective switch, if failure occurs in the 1+1 ring network, the wavelength selective switch is controlled so that a portion having a specific wavelength is transmitted from the protection ring of the 1+1 ring network to the working ring of the 1:1 ring network.

13. The multi-ring network operating method of claim 8, wherein, in the transmitting of the input multi-wavelength optical signal to at least one wavelength selective switch, if failure occurs in the 1+1 ring network, the wavelength selective switch is controlled so that a portion having a specific wavelength is transmitted from the protection ring of the 1+1 ring network to the protection ring of the 1:1 ring network.

14. A multi-ring network operating system for cross-connecting at least two ring networks, the system comprising:
a ring network connection unit connecting an input working ring and an input protection ring of a first ring network to an output working ring and an output protection ring of a second ring network;
an optical coupler splitting an input multi-wavelength optical signal of the first ring network into at least one portion each having a specific wavelength;
a connection control unit transmitting the input multi-wavelength optical signal to at least one wavelength selective switch; and
the at least one wavelength selective switch selectively passing at least one of the portions of the input multi-wavelength optical signal through at least one output of the second ring network,
wherein the system includes a multi-casting function both in an optical domain and in an electrical domain so that if the input signal does not require signal reproduction or wavelength conversion, it is cross-connected in the optical domain, and if the input signal requires signal reproduction or wavelength conversion, it is cross-connected in the electrical domain.

15. The multi-ring network operating system of claim 14, wherein the at least two ring networks are 1:1 protection networks.

16. The multi-ring network operating system of claim 14, wherein the at least two ring networks are 1+1 protection networks.

17. The multi-ring network operating system of claim 16, wherein, if failure occurs in at least one of the ring networks, the connection control unit controls the wavelength selective switch so that a portion having a specific wavelength is simultaneously transmitted from the protection ring of the ring network with the failure to both the working ring and the protection ring of the ring network without the failure.

18. The multi-ring network operating system of claim 16, wherein the connection control unit connects one of the input working ring and the input protection ring of the first ring network to both the output working ring and the output protection ring of the second ring network and simultaneously transmits portions having specific wavelengths from the one of the input working ring and the input protection ring of the first ring to both the output working ring and the output protection ring.

19. The multi-ring network operating system of claim 14, wherein the input working ring and the input protection ring of the first ring network are connected to the output working ring and the output protection ring of the second ring network, wherein portions having specific wavelengths are transmitted between the cross-connected working rings, and the cross-connected protection rings.

20. The multi-ring network operating system of claim 14, wherein at least one of the at least two ring networks is a 1+1 protection network.

21. The multi-ring network operating system of claim 14, wherein at least one of the at least two ring networks is a 1:1 protection network, and at least one of the at least two ring networks is a 1+1 protection network.

22. The multi-ring network operating system of claim 21, wherein the connection control unit controls the wavelength selective switch so that a portion having a specific wavelength is simultaneously transmitted from the protection ring of the 1:1 ring network to both the working ring and the protection ring of the 1+1 ring network.

23. The multi-ring network operating system of claim 21, wherein, if an failure occurs in the 1:1 ring network, the connection control unit controls the wavelength selective switch so that a portion having a specific wavelength is simultaneously transmitted from the protection ring of the 1:1 ring network to both the working ring and the protection ring of the 1+1 ring network.

24. The multi-ring network operating system of claim 21, wherein the connection control unit controls the wavelength selective switch so that a portion having a specific wavelength transmitted from only one of the working ring and the protection ring of the 1+1 ring network is transmitted to the working ring of the 1:1 ring network.

25. The multi-ring network operating system of claim 21, wherein, if an failure occurs in the 1+1 ring network, the connection control unit controls the wavelength selective switch so that a portion having a specific wavelength is transmitted from the protection ring of the 1+1 ring network to the working ring of the 1:1 ring network.

26. The multi-ring network operating system of claim 21, wherein, if an failure occurs in the 1+1 ring network, the connection control unit controls the wavelength selective switch so that a portion having a specific wavelength is transmitted from the protection ring of the 1+1 ring network to the protection ring of the 1:1 ring network.

27. A multi-dimensional cross-connect apparatus used in a multi-ring network operating system, the apparatus comprising:
an optical coupler splitting an input multi-wavelength optical signal into at least one portion each having a specific wavelength;
a connection control unit transmitting the input multi-wavelength optical signal to at least one wavelength selective switch: and
the at least one wavelength selective switch selectively passing at least one of the portions of the input multi-wavelength optical signal through at least one output,
wherein the apparatus includes a multi-casting function both in an optical domain and in an electrical domain so that if the input signal does not require signal reproduction or wavelength conversion, it is cross-connected in the optical domain, and if the input signal requires signal reproduction or wavelength conversion, it is cross-connected in the electrical domain.

* * * * *